(12) United States Patent
Umeya et al.

(10) Patent No.: US 7,057,813 B2
(45) Date of Patent: Jun. 6, 2006

(54) PROJECTION SCREEN AND PROJECTION SYSTEM COMPRISING THE SAME

(75) Inventors: Masanori Umeya, Tokyo-To (JP);
Masahiro Hatano, Tokyo-To (JP);
Akira Izawa, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 127 days.

(21) Appl. No.: 10/895,262

(22) Filed: Jul. 21, 2004

(65) Prior Publication Data

US 2005/0057804 A1    Mar. 17, 2005

(30) Foreign Application Priority Data

Jul. 22, 2003 (JP) ............................. 2003-277415

(51) Int. Cl.
| | |
|---|---|
| *G02F 1/03* | (2006.01) |
| *G02F 1/07* | (2006.01) |
| *G02F 1/1333* | (2006.01) |
| *G02F 1/1335* | (2006.01) |
| *G02B 5/30* | (2006.01) |
| *G02B 27/26* | (2006.01) |
| *C09K 19/02* | (2006.01) |

(52) U.S. Cl. ................ 359/459; 359/454; 359/487; 359/352; 359/465; 349/87; 349/96; 349/176

(58) Field of Classification Search ............... 359/443, 359/454, 459, 500, 492, 452, 599, 487, 352, 359/465; 349/185, 87, 96, 176
See application file for complete search history.

(56) References Cited

U.S. PATENT DOCUMENTS 5,335,022 A * 8/1994 Braun et al. ............ 348/744

(Continued)

FOREIGN PATENT DOCUMENTS

| EP | 0 648 048 A1 | 10/1994 |
| JP | 05-107660 | 4/1993 |

(Continued)

OTHER PUBLICATIONS

"Bragg Reflection From Cholesteric Liquid Crystals," W.D. St. John, et al., Physical review E, vol. 51, No. 2, Feb. 1, 1995, pp. 1191-1198.

(Continued)

*Primary Examiner*—W. B. Perkey
*Assistant Examiner*—Magda Cruz
(74) *Attorney, Agent, or Firm*—Oliff & Berridge, PLC

(57) ABSTRACT

The present invention provides a projection screen capable of sharply displaying an image even under bright environmental light, of improving brightness distribution and viewing angle, and of providing high image visibility, and a projection system including such a projection screen. The projection screen includes: a polarized-light selective reflection layer that selectively reflects a specific polarized-light component; a substrate that supports the polarized-light selective reflection layer and a circular Fresnel lens provided on the observation side of the polarized-light selective reflection layer. The circular Fresnel lens controls the optical axis of right-handed circularly polarized light projected on the projection screen so that the light enters the polarized-light selective reflection layer nearly vertically to it regardless of the point and angle at which the light is incident on this layer.

22 Claims, 14 Drawing Sheets

U.S. PATENT DOCUMENTS

| | | |
|---|---|---|
| 6,381,068 B1 | 4/2002 | Harada et al. |
| 6,449,089 B1 * | 9/2002 | Moshrefzadeh et al. .... 359/454 |
| 6,906,764 B1 * | 6/2005 | Kashima et al. ............... 349/98 |
| 2004/0252373 A1 * | 12/2004 | Umeya ........................ 359/449 |

FOREIGN PATENT DOCUMENTS

| | | |
|---|---|---|
| JP | 06082747 A * | 3/1994 |
| JP | 02-540445 | 11/2002 |

OTHER PUBLICATIONS

"Optical Properties of Diffusion-Type Cholesteric Liquid Crystalline Polymer Film," A. Shiozawa et al., Molecular and Liquid Crystals, vol. 364, 2001, pp. 464-478.

* cited by examiner

PROJECTION SCREEN AND PROJECTION SYSTEM COMPRISING THE SAME

BACKGROUND OF THE INVENTION

1. Field of the Invention

The present invention relates to a projection system in which imaging light emitted from a projector is projected on a projection screen to produce thereon an image. More particularly, the present invention relates to a projection screen capable of sharply displaying an image, of improving brightness distribution and viewing angle, and of providing high image visibility, and to a projection system comprising such a projection screen.

2. Background Art

A conventional projection system is usually as follows: imaging light emitted from a projector is projected on a projection screen, and viewers observe the light reflected from the projection screen as an image.

Typical examples of projection screens for use in such conventional projection systems include white-colored paper or cloth materials, and plastic films coated with inks that scatter white light. Besides, high-quality projection screens that comprise scattering layers containing beads, pearlescent pigments, or the like, capable of controlling the scattering of imaging light, are now commercially available.

Since projectors have become smaller in size and moderate in price in recent years, demand for household projectors such as projectors for family theaters is growing, and an increasing number of families are now enjoying projection systems. Household projection systems are often placed in living rooms or the like, which are usually so designed that environmental light such as sunlight and light from lighting fixtures come in abundantly. Therefore, projection screens for use in household projection systems are expected to show good image display performance even under bright environmental light.

However, the above-described conventional projection screens cannot show good image display performance under bright environmental light because they reflect not only imaging light but also environmental light such as sunlight and light from lighting fixtures.

In such a conventional projection system, differences in the intensity of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

However, since the above-described conventional projection screen reflects both imaging light and environmental light such as sunlight and light from lighting fixtures without distinction, both the white- and black-indication parts get lighter, and differences in brightness between white and black become small. For this reason, the conventional projection screen cannot satisfactorily provide good image display unless the influence of environmental light such as sunlight and light from lighting fixtures on the projection screen is suppressed by using a means for shading a room, or by placing the projection screen in a dark environment.

Under these circumstances, studies have been made on projection screens capable of showing good image display performance even under bright environmental light. There have so far been proposed projection screens using, for example, holograms or polarized-light-separating layers (see Japanese Laid-Open Patent Publications No. 107660/1993 (Patent Document 1) and No. 540445/2002 (Patent Document 2)).

Of these conventional projection screens, those ones using holograms have the advantage that the white-indication part can be made lighter if their light scattering effect is properly controlled, so that they can show relatively good image display performance even under bright environment light. However, holograms have wavelength selectivity but no polarization selectivity, so that the projection screens using holograms can display images only with limited sharpness. Moreover, because of production problems, it is difficult to produce large-sized projection screens by making use of holograms.

On the other hand, on the above-described conventional projection screens using polarized-light-separating layers, it is possible to make the white-indication part lighter and the black-indication part darker. Therefore, these projection screens can sharply display images even under bright environmental light as compared with the projection screens using holograms.

Specifically, Patent Document 1 describes a projection screen for which a cholesteric liquid crystal that reflects red, green and blue light (right- or left-handed circularly polarized light) contained in imaging light is used in order to make the projection screen not reflect nearly half of the environmental light incident on the screen, by making use of the circularly-polarized-light-separating property of the cholesteric liquid crystal.

On the other hand, Patent Document 2 describes a projection screen using, as a reflective polarization element, a multi-layered reflective polarizer or the like, having diffusing properties. This projection screen does not reflect part of the environmental light incident on it because of the polarized-light-separating property of the multi-layered reflective polarizer or the like, and diffuses the reflected light by interfacial reflection that occurs at an interface between materials having different refractive indices, constituting the multi-layered reflective polarizer, or by means of a diffusing element that is provided separately from the multi-layered reflective polarizer. Further, Patent Document 2 describes a projection screen using a cholesteric, reflective polarizer or the like as a reflective polarization element in combination with a diffusing element. This projection screen does not reflect part of the environmental light incident on it because of the polarized-light-separating property of the cholesteric, reflective polarizer or the like, and scatters the reflected light by means of the diffusing element that is provided separately from the cholesteric, reflective polarizer.

In the projection screens using polarized-light-separating layers, described in Patent Documents 1 and 2, however, the relationship between the angle at which light enters the projection screen and the angle at which the light is diffuse-reflected from the projection screen is of specular reflection. Therefore, the image projected on any of these projection screens appears uneven, depending on the position from where the image is observed. Specifically, since the light (imaging light) reflected from the projection screen contains light not returning to the observation point, the brightness distribution on the projection screen becomes non-uniform, and the image displayed on the projection screen appears dark (viewing angle gets narrow) depending on the point at which a viewer is observing the image, and thus becomes uneven. For this reason, in order to improve the visibility of the image projected on the projection screen, consideration must be given to the direction in which the reflected light (imaging light) emerges from the projection screen.

SUMMARY OF THE INVENTION

The present invention has been accomplished in the light of the above-described problems. An object of the present invention is, therefore, to provide a projection screen capable of sharply displaying an image even under bright environmental light, of improving brightness distribution and viewing angle, and of providing high image visibility, and a projection system comprising such a projection screen.

A projection screen of the present invention, for displaying an image by reflecting imaging light that is projected from the observation side, comprises: a polarized-light selective reflection layer that selectively diffuse-reflects a specific polarized-light component; and an optical member provided on the observation side of the polarized-light selective reflection layer, the optical member controlling the direction in which the imaging light diffuse-reflected from the polarized-light selective reflection layer emerges from the projection screen, wherein the optical member controls the direction of emergence of the imaging light so that the imaging light diffuse-reflected from the polarized-light selective reflection layer travels in a specific direction between the direction in which the imaging light has entered the polarized-light selective reflection layer and the direction in which the entered image light travels when specularly reflected.

In the above-described projection screen according to the present invention, it is preferable that the optical member controls the direction in which the imaging light passes through the optical member so that the direction in which the imaging light emerges from the optical member toward the polarized-light selective reflection layer is closer to the direction of the normal to the optical member than the direction in which the imaging light has entered the optical member.

Further, in the above-described projection screen according to the present invention, it is preferable that the specific polarized-light component be right- or left-handed circularly polarized light. The specific polarized-light component may also be linearly polarized light of one vibration direction.

Furthermore, in the above-described projection screen according to the present invention, the polarized-light selective reflection layer may include a polarized-light selective reflection layer body that reflects the specific polarized-light component, and a diffusing element that diffues light that is reflected from the polarized-light selective reflection layer body. Alternatively, the polarized-light selective reflection layer itself may have a diffusing property. In the latter case, it is preferable that the polarized-light selective reflection layer has a cholesteric liquid crystalline structure and, owing to structural non-uniformity in the cholesteric liquid crystalline structure, diffuses the specific polarized-light component.

Furthermore, it is preferable that the above-described projection screen according to the present invention further comprises a substrate that supports the polarized-light selective reflection layer. In this case, the substrate may be an absorptive substrate comprising a light-absorbing layer adapted to absorb light in the visible region, or a transparent substrate adapted to transmit at least part of light in the visible region.

Furthermore, in the above-described projection screen according to the present invention, it is preferable that the polarized-light selective reflection layer includes at least two partial selective reflection layers that are laminated to each other. In this case, it is preferable that an intermediate layer having a barrier or adhesion property be provided between each neighboring two of the partial selective reflection layers.

Furthermore, in the above-described projection screen according to the present invention, it is preferable that the optical member is at least one member selected from the group consisting of a Fresnel lens, a prism lens, a lenticular lens and a microlens.

Furthermore, it is preferable that the above-described projection screen according to the present invention further comprises a functional layer containing at least one layer selected from the group consisting of a hard coat layer, an anti-glaring layer, an anti-reflection layer, an ultraviolet-light-absorbing layer and an antistatic layer. In the case where the function layer is an anti-glaring layer, the anti-glaring layer is preferably composed of a layer with an irregularly roughened surface, isotropic with respect to refractive index. For example, a TAC film with a matte surface is conveniently used as the anti-glaring layer.

A projection system according to the present invention comprises: the above-described projection screen according to the present invention; and a projector that projects imaging light on the projection screen.

In the above-described projection system according to the present invention, it is preferable that the projection screen selectively reflects only light in a wave range identical with the wave range in which the imaging light projected from the projector falls.

Further, in the above-described projection system according to the present invention, it is preferable that the imaging light to be projected on the projection screen from the projector mainly contains the same polarized-light component as the one which the projection screen selectively reflects.

Furthermore, it is preferable that the above-described projection system according to the present invention further comprises an illuminant that illuminates a space in which the projection screen is placed, being so set that the light from the illuminant directly illuminates the projection screen, wherein the light that is emitted from the illuminant toward the projection screen mainly contains a polarized-light component different from the one which the projection screen selectively reflects. Alternatively, the projection system according to the present invention may further comprise an illuminant that illuminates a space in which the projection screen is placed, being so set that the light from the illuminant indirectly illuminates the projection screen via a reflector, wherein the light that is emitted from the illuminant toward the reflector mainly contains the same polarized-light component as the one which the projection screen selectively reflects.

According to the present invention, (1) an optical member for controlling the direction in which the imaging light diffuse-reflected from the polarized-light selective reflection layer emerges from the projection screen is provided on the observation side of the polarized-light selective reflection layer that selectively diffuse-reflects a specific polarized-light component, thereby making the direction in which the imaging light emerging from the polarized-light selective reflection layer travels closer to the direction of the normal to the optical member with respect to the direction in which the imaging light has entered the polarized-light selective reflection layer. Namely, the direction in which the imaging light emerges from the projection screen is controlled by the optical member so that the imaging light diffuse-reflected from the polarized-light selective reflection layer travels in a specific direction between the direction in which the imaging light has entered the polarized-light selective reflection layer and the direction in which the entered image light travels when specularly reflected. It is, therefore, possible to make the imaging light diffuse-reflected from the polarized-light selective reflection layer travel toward a particular observation point at which a viewer makes observation, and the projection screen can thus have improved brightness distribution and viewing angle.

(2) It is herein preferable that the optical member provided on the observation side of the polarized-light selective reflection layer that selectively diffuse-reflects a specific polarized-light component controls the direction in which the imaging light passes through the optical member so that the direction in which the imaging light emerges from the optical member toward the polarized-light selective reflection layer is closer to the direction of the normal to the optical member than the direction in which the imaging light has entered the optical member. In this case, by controlling the angle at which the light enters the polarized-light selective reflection layer after passing through the optical member, it becomes possible to control the angle at which the light is reflected from the polarized-light selective reflection layer, thereby controlling the directivity of the light that is reflected from the polarized-light selective reflection layer. Moreover, in this case, by controlling the angle at which the light emerges from the projection screen toward the observation side after being reflected from the polarized-light selective reflection layer and passing through the optical member, it is also possible to make the light reflected from the polarized-light selective reflection layer travel toward a particular observation point. By this, it is ensured that the imaging light diffuse-reflected from the polarized-light selective reflection layer travels toward a particular observation point at which a viewer makes observation, and the projection screen can thus have improved brightness distribution and viewing angle.

(3) The polarized-light selective reflection layer herein selectively reflects only a specific polarized-light component (for example, right-handed circularly polarized light, if the specific polarized-light component is either right- or left-handed circularly polarized light) owing to its polarized-light-separating property. It is, therefore, possible to make the polarized-light selective reflection layer reflect only approximately 50% of unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer selectively reflects (e.g., right-handed circularly polarized light), the polarized-light selective reflection layer can reflect nearly 100% of the imaging light projected, that is, the polarized-light selective reflection layer can efficiently reflect the imaging light. Even a projector that emits linearly polarized light, such as a liquid crystal projector, can be used, regardless of the direction of linear polarization, for projecting imaging light on the projection screen if a retardation layer or the like for converting linearly polarized light into circularly polarized light is used.

(4) The specific polarized-light component which the polarized-light selective reflection layer selectively reflects may also be a linear polarized light of one vibration direction (P- or S-polarized light). Also in this case, the polarized-light selective reflection layer selectively reflects only a specific polarized-light component (e.g., P-polarized light) owing to its polarized-light-separating property. It is, therefore, possible to make the polarized-light selective reflection layer reflect only approximately 50% of unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer selectively reflects (e.g., P-polarized light), the polarized-light selective reflection layer can reflect nearly 100% of the imaging light projected, that is, the polarized-light selective reflection layer can efficiently reflect the imaging light. In the case where the specific polarized-light component which the polarized-light selective reflection layer selectively reflects is a linearly polarized light of one vibration direction, the projection screen can brightly display an image if it is directed to the direction of linear polarization of light emitted by a projector.

(5) The polarized-light selective reflection layer may include a polarized-light selective reflection layer body that reflects a specific polarized-light component, and a diffusing element that diffuses light reflected from the polarized-light selective reflection layer body. In this case, since the polarized-light-separating property and diffusing properties can be made independent of each other, it is possible to easily control these two properties.

(6) Alternatively, the polarized-light selective reflection layer itself may have diffusing properties. In this case, since the state of polarization of light incident on the polarized-light selective reflection layer is not disturbed, the intensity of the light that is reflected from the polarized-light-selective reflection layer is high. Specifically, in the case where a diffusing element is provided on the observation side of a reflective polarization element, light passes through the diffusing element before entering the reflective polarization element, and the state of polarization of the light is disturbed (this is called "depolarization"). In this case, the light that passes through the diffusing element includes two types of light, environmental light (sunlight, etc.) and imaging light. When the state of polarization of environmental light is disturbed by the diffusing element, the light which the reflective polarization element inherently transmits is, owing to depolarization, converted into a light component which the reflective polarization element reflects, and is reflected from the reflective polarization element as unnecessary light. On the other hand, when the state of polarization of imaging light is disturbed by the diffusing element, the light which the reflective polarization element inherently reflects is, owing to depolarization, converted into a light component which the reflective polarization element does not reflect, and passes through the reflective polarization element. Because of these two phenomena, the original polarized-light-separating property is impaired, and image visibility cannot fully be improved. However, if the polarized-light selective reflection layer itself has diffusing properties, the above-described "depolarization" does not occur. It is, therefore, possible to improve image visibility while maintaining the polarized-light-separating property inherent in the polarized-light selective reflection layer.

(7) Preferably, the polarized-light selective reflection layer has a cholesteric liquid crystalline structure, and, owing to structural non-uniformity in the cholesteric liquid crystalline structure, diffuses a specific polarized-light component. In this case, since environmental light and imaging light that pass through the polarized-light selective reflection layer do not undergo the above-described "depolarization", it is possible to improve image visibility while retaining the original polarized-light-separating property of the polarized-light selective reflection layer. Specifically, in the polarized-light selective reflection layer, if its cholesteric liquid crystalline structure is structurally non-uniform because, for example, the helical structure parts of the cholesteric liquid crystalline structure have helical axes extending in different directions, the polarized-light selective reflection layer reflects imaging light not by specular reflection but by diffuse reflection, and the reflected light can thus be readily recognized as an image. At this time, owing to structural non-uniformity in the cholesteric liquid crystalline structure, the polarized-light selective reflection layer diffuses light that is selectively reflected; therefore, the polarized-light selective reflection layer can reflect a specific polarized-light component while diffusing it, and, at the same time, transmit the other light components without diffusing them.

(8) Furthermore, if at least one member selected from the group consisting of a Fresnel lens, a prism lens, a lenticular lens and a microlens is used as the optical member, the angle at which light enters the polarized-light selective reflection layer after passing through the optical member is controlled according to the point of incidence (the center portion, edge portion, or the like of the polarized-light selective reflection layer). It is therefore possible to control the angle at which the light is reflected from the polarized-light selective reflection layer, and to control the directivity of the light that is reflected from the polarized-light selective reflection layer. Moreover, the angle at which the light reflected from the polarized-light selective reflection layer emerges from the optical member, after passing through the optical member, toward the observation side is controlled according to the point of emergence (the center portion, edge portion, or the like of the polarized-light selective reflection layer), so that it is possible to let the light reflected from the polarized-light selective reflection layer travel toward a particular observation point. Thus, it is ensured that the imaging light diffuse-reflected from the polarized-light selective reflection layer travels toward a particular observation point at which a viewer makes observation, and the projection screen can therefore show improved brightness distribution and viewing angle.

(9) Furthermore, if a functional layer containing at least one layer selected from the group consisting of a hard coat layer, an anti-glaring layer, an anti-reflection layer, an ultraviolet-light-absorbing layer and an antistatic layer is provided, for example, on the observation side surface of the polarized-light selective reflection layer, it is possible to prevent the projection screen from being scratched, staining, glaring, excessively reflecting light, or discoloring due to ultraviolet light components, or to remove static electricity.

(10) Furthermore, a projection system comprising the above-described projection screen and a projector that projects imaging light on the projection screen can be herein used. In this case, it is possible to increase image contrast by suppressing the influence of environmental light such as sunlight and light from lighting fixtures by making use of the polarized-light-separating property of the polarized-light selective reflection layer in the projection screen, and, at the same time, to scatter the imaging light that is reflected, without lowering the image visibility, by making use of structural non-uniformity in the cholesteric liquid crystalline structure of the polarized-light selective reflection layer. It is, therefore, possible to sharply display an image even under bright environmental light.

(11) If the polarized-light selective reflection layer in the projection screen for use in this projection system is made to selectively reflect only light in a wave range identical with the wave range in which the imaging light to be projected from the projector falls (e.g., light in a specific wave range covering only a part of the visible region), it is possible to further suppress the influence of environmental light, such as sunlight and light from lighting fixtures, incident on the projection screen to increase image contrast, thereby further improving image visibility. Namely, a projector that projects imaging light on a projection screen usually attains color display by using light in the wave ranges for red (R), green (G) and blue (B) colors, the three primary colors of light. For example, assuming that light enters a projection screen vertically to it, the projector is made to project light in wave ranges with center wavelengths of 430–460 nm, 540–570 nm, and 580–620 nm. For this reason, by making the projection screen selectively reflect only light in wave ranges identical with the wave ranges in which the imaging light to be projected from the projector fall, it is possible to prevent reflection of environmental light, such as sunlight and light from lighting fixtures, in the visible region, not in the above-described wave ranges, thereby increasing image contrast.

(12) Furthermore, if the imaging light to be projected on the projection screen from the projector is made to mainly contain the same polarized-light component as the one which the projection screen selectively reflects, it is possible to effectively prevent the production of stray light that is caused by a polarized-light component (e.g., left-handed circularly polarized light) different from the one which the polarized-light selective reflection layer in the projection screen selectively reflects, thereby enhancing imaging contrast.

(13) Furthermore, in the case where an illuminant is so set that the light from the illuminant directly illuminates the projection screen, if the light to be emitted from the illuminant toward the projection screen is made to mainly contain a polarized-light component (e.g., left-handed circularly polarized light) different from the one which the projection screen selectively reflects, it is possible to effectively prevent the polarized-light selective reflection layer in the projection screen from reflecting the light from the illuminant, thereby increasing image contrast.

(14) Furthermore, in the case where an illuminant is so set that the light from the illuminant indirectly illuminates the projection screen via a reflector, if the light to be emitted from the illuminant toward the reflector is made to mainly contain the same polarized-light component (e.g., right-handed circularly polarized light) as the one which the projection screen selectively reflects, the light from the illuminant, reversed in the state of polarization when reflected from the reflector, is to mainly contain the same polarized-light component (e.g., right-handed circularly polarized light) as the one which the projection screen selectively reflects. It is, therefore, possible to effectively prevent the polarized-light selective reflection layer in the projection screen from reflecting the light from the illuminant, thereby enhancing image contrast.

DETAILED DESCRIPTION OF PREFERRED EMBODIMENTS

By referring to the accompanying drawings, embodiments of the present invention will be described hereinafter.

Projection Screen

First of all, a projection screen according to an embodiment of the present invention will be described with reference to FIG. 1.

Figure 1:
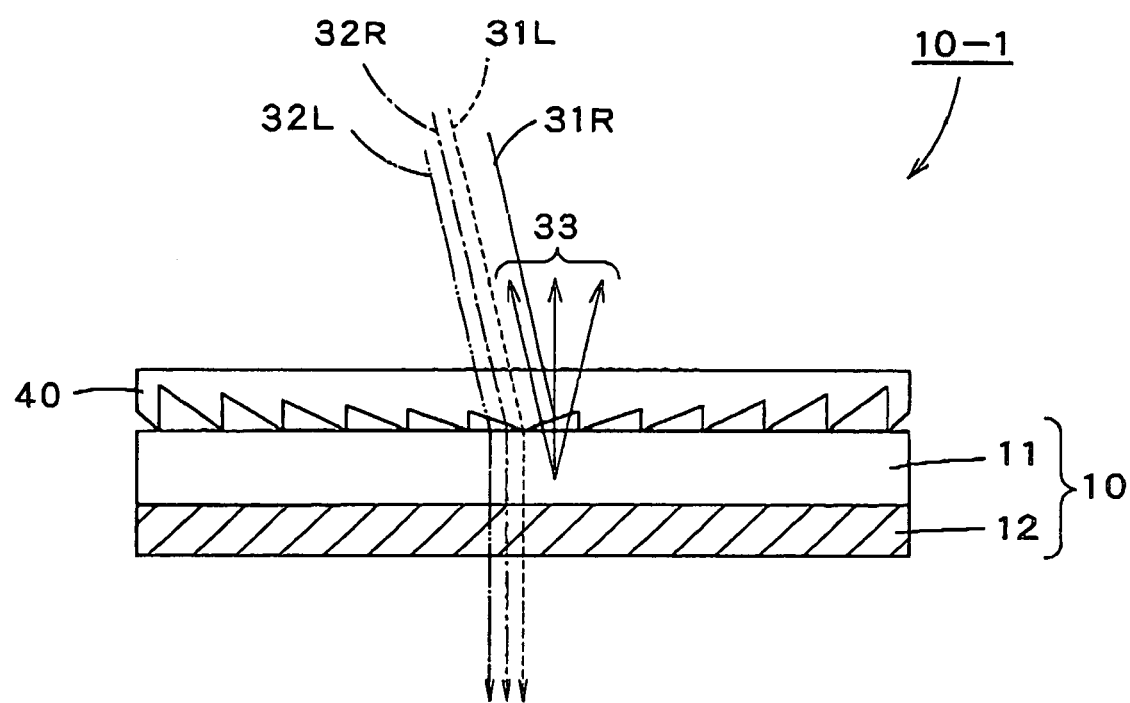
FIG. 1 is a diagrammatic sectional view showing a projection screen according to an embodiment of the present invention.

As shown in FIG. 1, a projection screen 10-1 according to this embodiment is for displaying an image by reflecting imaging light projected from the observation side (the upper side of the figure). The projection screen 10-1 comprises: a cholesteric liquid crystalline, polarized-light selective reflection layer 11 for selectively reflecting a specific polarized-light component; a substrate 12 for supporting the polarized-light selective reflection layer 11; and a circular Fresnel lens (optical member) 40 provided on the observation side of the polarized-light selective reflection layer 11. The circular Fresnel lens 40 controls the direction in which the imaging light diffuse-reflected from the polarized-light selective reflection layer 11 emerges from the projection screen 10-1. The polarized-light selective reflection layer 11 and the substrate 12 constitute a projection screen body 10.

[Projection Screen Body]

The projection screen body 10 will be firstly described.

The polarized-light selective reflection layer 11 constituting the projection screen body 10 is made from a cholesteric, liquid crystalline composition, and physically, liquid crystalline molecules in this layer are aligned in helical fashion in which the directors of the liquid crystalline molecules are continuously rotated in the direction of the thickness of the layer.

Owing to such a physical alignment of the liquid crystalline molecules, the polarized-light selective reflection layer 11 has the polarized-light-separating property, the property of separating a light component circularly polarized in one direction from a light component circularly polarized in the opposite direction. Namely, the polarized-light selective reflection layer 11 converts unpolarized light that enters the layer along the helical axis into light in two different states of polarization (right-handed circularly polarized light and left-handed circularly polarized light), and transmits one of these light and reflects the other. This phenomenon is known as circular dichroism. If the direction of rotation of liquid crystalline molecular helix is properly selected, a light component circularly polarized in the same direction as this direction of rotation is selectively reflected.

In this case, the scattering of polarized light is maximized at the wavelength $\lambda_o$ given by the following equation (1):

$$\lambda_o = n_{av} \cdot p, \quad (1)$$

where p is the helical pitch in the helical structure consisting of liquid crystalline molecules (the length of one liquid crystalline molecular helix), and $n_{av}$ is the mean refractive index on a plane perpendicular to the helical axis.

On the other hand, the width $\Delta\lambda$ of the wave range in which the wavelength of light to be reflected falls is given by the following equation (2):

$$\Delta\lambda = \Delta n \cdot p, \quad (2)$$

where $\Delta n$ is the birefringence value.

Namely, as shown in FIG. 1, of the unpolarized light that has entered the projection screen body 10 from the observation side (right-handed circularly polarized light 31R and left-handed circularly polarized light 31L in the selective reflection wave range, and right-handed circularly polarized light 32R and left-handed circularly polarized light 32L not in the selective reflection wave range), one of the circularly polarized-light components in the wave range (selective reflection wave range) with the width Δλ, centered at the wavelength λ0, for example, right-handed circularly polarized light 31R in the selective reflection wave range, is reflected from the projection screen body 10 as reflected light 33, and the other light (e.g., left-handed circularly polarized light 31L in the selective reflection wave range, and right-handed circularly polarized light 32R and left-handed circularly polarized light 32L not in the selective reflection wave range) pass through the projection screen body 10, owing to the above-described polarized-light-separating property.

Figure 2A:
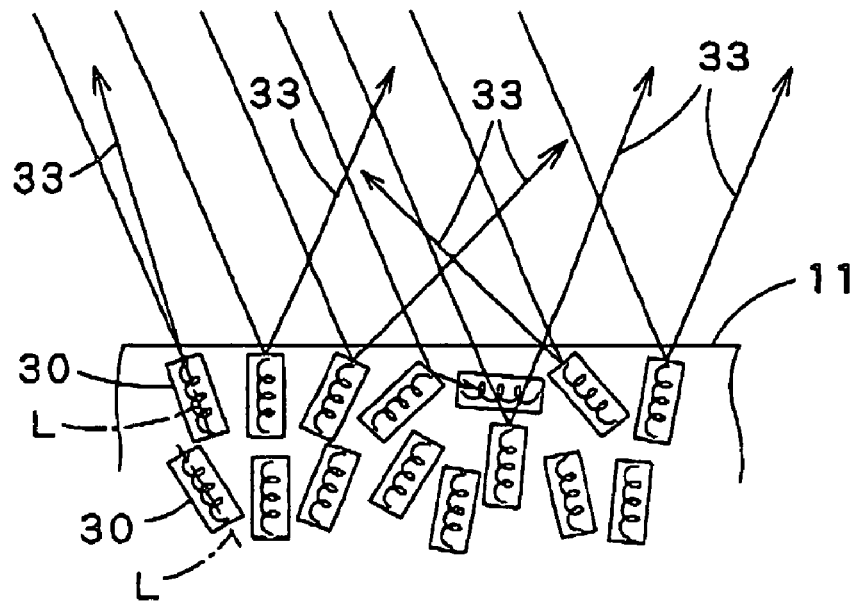
FIGS. 2A and 2B are illustrations for explaining the state of orientation of and optical function of the projection screen body (the polarized-light selective reflection layer) of the projection screen shown in FIG. 1.

The cholesteric liquid crystalline structure of the polarized-light selective reflection layer 11 comprises a plurality of helical structure parts 30 that are different in the direction of the helical axis L, as shown in FIG. 2A. Owing to structural non-uniformity in such a cholesteric liquid crystalline structure, the polarized-light selective reflection layer 11 diffuses light that is selectively reflected (reflected light 33). The state in which the cholesteric liquid crystalline structure is structurally non-uniform herein includes: the state in which the helical structure parts 30 of the cholesteric liquid crystalline structure are different in the direction of the helical axis L; the state in which at least some of the planes of nematic layers (the planes on which the directors of liquid crystalline molecules point in the same X-Y direction) are not parallel to the plane of the polarized-light selective reflection layer 11 (the state in which, in a sectional TEM photo of a cholesteric liquid crystalline structure specimen that has been stained, continuous curves that appear as light-and-dark patterns are not parallel to the substrate plane); and the state in which finely divided particles of a cholesteric liquid crystal are dispersed in the cholesteric liquid crystalline structure as a pigment. The "diffusion" that is caused by such structural non-uniformity in the cholesteric liquid crystalline structure means that the light (imaging light) reflected from the projection screen body 10 is spread or scattered to such an extent that viewers can recognize the reflected light as an image.

Figure 2B:
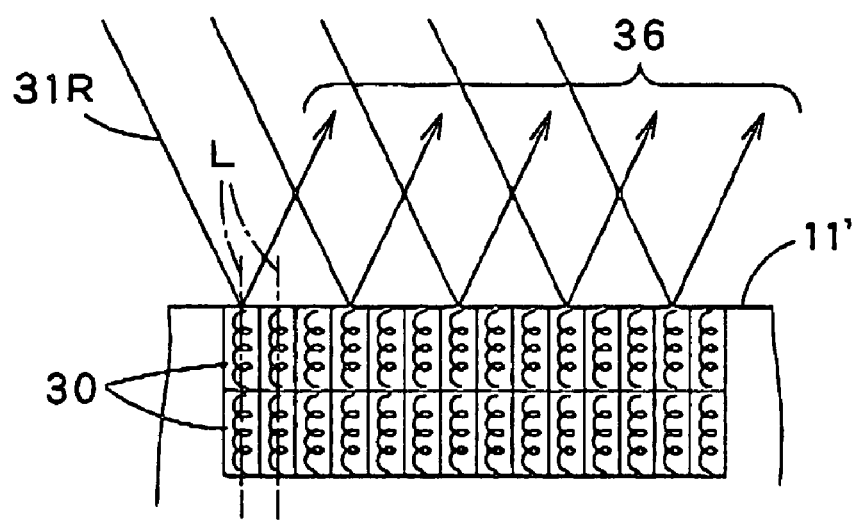

On the contrary, a conventional cholesteric liquid crystalline structure is in the state of planar orientation, and the helical axes L of helical structure parts 30 of the cholesteric liquid crystalline structure extend in parallel in the direction of the thickness of the layer, as shown in FIG. 2B. Such a cholesteric liquid crystalline structure causes specular reflection when reflecting light that is selectively reflected (reflected light 36).

It is preferable that the helical structure parts 30 of the cholesteric liquid crystalline structure of the polarized-light selective reflection layer 11 has a specific helical pitch so that the polarized-light selective reflection layer 11 selectively reflects light in a specific wave range that covers only a part of the visible region (e.g., the wave range of 400 to 700 nm). More specifically, it is preferable that the cholesteric liquid crystalline structure of the polarized-light selective reflection layer 11 has at least two discontinuously different helical pitches so that the polarized-light selective reflection layer 11 selectively reflects light only in a wave range identical with the wave range of imaging light projected from a projector such as a liquid crystal projector (e.g., light in the specific wave range that covers only a part of the visible region). A projector usually attains color display by using light in the wave ranges for red (R), green (G) and blue (B) colors, the primary three colors of light. Therefore, assuming that light enters the polarized-light selective reflection layer 11 vertically to it, it is preferable to decide the helical pitches in the cholesteric liquid crystalline structure so that the polarized-light selective reflection layer 11 selectively reflects light in wave ranges with center wavelengths of 430–460 nm, 540–570 nm, and 580–620 nm.

The wave ranges of 430 to 460 nm, 540 to 570 nm, and 580 to 620 nm that are used as the red (R), green (G) and blue (B) color wave ranges, respectively, are commonly used for color filters, light sources, or the like for use in displays that produce white color by the three primary colors. Red (R), green (G) and blue (B) colors are shown as line spectra that peak at specific wavelengths (e.g., in the case of green (G) color, this wavelength is typically 550 nm). However, these line spectra have certain widths, and moreover, the projected light have wavelengths that vary depending upon the design of the projector, the type of the light source, and the like. It is, therefore, preferable that the wave range for each color has a width of 30 to 40 nm. If the red (R), green (G) and blue (B) color wave ranges are set outside the above-described respective ranges, it is impossible to produce pure white, and only yellowish or reddish white is obtained.

In the case where the red (R), green (G) and blue (B) color wave ranges are given as selective reflection wave ranges that are independent of one another, it is preferable that the cholesteric liquid crystalline structure of the polarized-light selective reflection layer 11 has three helical pitches that are different discontinuously. There is a case where the red (R) and green (G) color wave ranges are included in one selective reflection wave range corresponding to one helical pitch. In this case, it is preferable that the cholesteric liquid crystalline structure of the polarized-light selective reflection layer 11 has two helical pitches that are different discontinuously.

Figure 3:
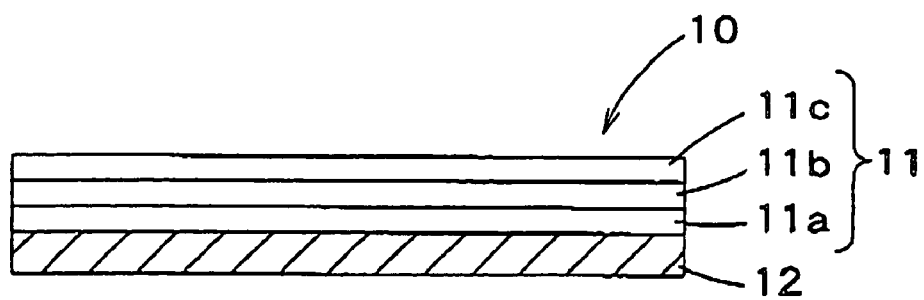
FIG. 3 is a diagrammatic sectional view showing a modification of the projection screen body of the projection screen shown in FIG. 1.

In the case where the cholesteric liquid crystalline structure of the polarized-light selective reflection layer 11 has two or more helical pitches that are different discontinuously, the polarized-light selective reflection layer 11 may be obtained by laminating at least two partial selective reflection layers that are different in helical pitch. Specifically, as shown in FIG. 3, a partial selective reflection layer 11a that selectively reflects light in the blue (B) color wave range, a partial selective reflection layer 11b that selectively reflects light in the green (G) color wage range, and a partial selective reflection layer 11c that selectively reflects light in the red (R) color wave range may be successively laminated to the substrate 12 in this order. The order in which the partial selective reflection layers 11a, 11b and 11c are laminated is not necessarily limited to the above-described one, and these partial selective reflection layers may be laminated in any order. Like the polarized-light selective reflection layer 11 shown in FIGS. 1 and 2A, each partial selective reflection layer 11a, 11b, 11c shown in FIG. 3 has a cholesteric liquid crystalline structure adapted to selectively reflect a specific polarized-light component (e.g., right-handed circularly polarized light) and to diffuse light that is selectively reflected, owing to structural non-uniformity in the cholesteric liquid crystalline structure.

It is preferable that the polarized-light selective reflection layer 11 (or each partial selective reflection layer 11a, 11b, 11c constituting the polarized-light selective reflection layer 11) be formed to have such a thickness that it can reflect approximately 100% of light in a specific state of polarization that is selectively reflected (such a thickness that the reflectance is saturated). This is because when the polarized-light selective reflection layer 11 has a reflectance of less than 100% for a specific polarized-light component that is selectively reflected (e.g., right-handed circularly polarized light), it cannot efficiently reflect imaging light. Although the reflectance of the polarized-light selective reflection layer 11 (or each partial selective reflection layer 11a, 11b, 11c constituting the polarized-light selective reflection layer 11) depends directly on the number of helical turns, it depends indirectly on the thickness of the polarized-light selective reflection layer 11 (or each partial selective reflection layer 11a, 11b, 11c constituting the polarized-light selective reflection layer 11) if the helical pitch is fixed. Specifically, since it is said that approximately 4 to 8 helical turns are needed to obtain a reflectance of 100%, each partial selective reflection layer 11a, 11b, 11c that reflects light in the red (R), green (G) or blue (B) color wave range is required to have a thickness of approximately 1 to 10 μm although this thickness varies depending on the type of the components of the liquid crystalline composition used for forming this layer and on the selective reflection wave range of this layer. On the other hand, the polarized-light selective reflection layer 11 (or each partial selective reflection layer 11a, 11b, 11c constituting the polarized-light selective reflection layer 11) should not be made thick limitlessly because if the layer is excessively thick, it becomes difficult to control the orientation of the layer, the layer cannot be made uniform, and the material itself for the layer absorbs light to a greater extent. For this reason, a thickness in the above-described range is proper for the polarized-light selective reflection layer 11 (or each partial selective reflection layer 11a, 11b, 11c).

Next, explanation for the substrate 12 will be given below.

The substrate 12 is for supporting the polarized-light selective reflection layer 11, and a material selected from plastic films, metals, paper, cloth, glass, and the like can be used for forming the substrate 12.

It is preferable that the substrate 12 comprises a light-absorbing layer adapted to absorb light in the visible region.

Figure 4:
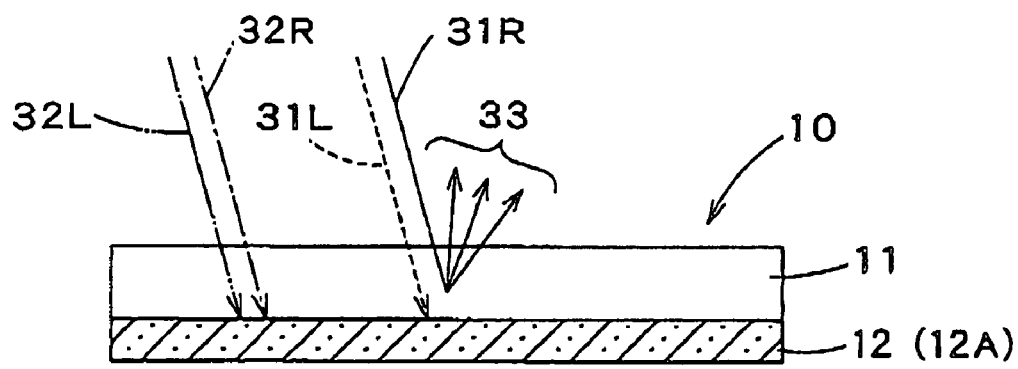
FIG. 4 is a diagrammatic sectional view showing another modification of the projection screen body of the projection screen shown in FIG. 1.

Specifically, for example, the substrate 12 (12A) may be made of a plastic film in which a black pigment is incorporated (e.g., a black PET film in which carbon is incorporated), as shown in FIG. 4. In this case, the substrate 12 (12A) itself serves as a light-absorbing layer (light-absorptive substrate). Such a substrate 12 absorbs those unpolarized light entering the projection screen body 10 from the observation side that are inherently not reflected from the projection screen body 10 as reflected light 33 (left-handed circularly polarized light 31L in the selective reflection wave range, and right-handed circularly polarized light 32R and left-handed circularly polarized light 32L not in the selective reflection wave range) and the light that enters the projection screen body 10 from the backside. It is, therefore, possible to effectively prevent reflection of environmental light such as sunlight and light from lighting fixtures and production of stray light from imaging light.

Figure 5:
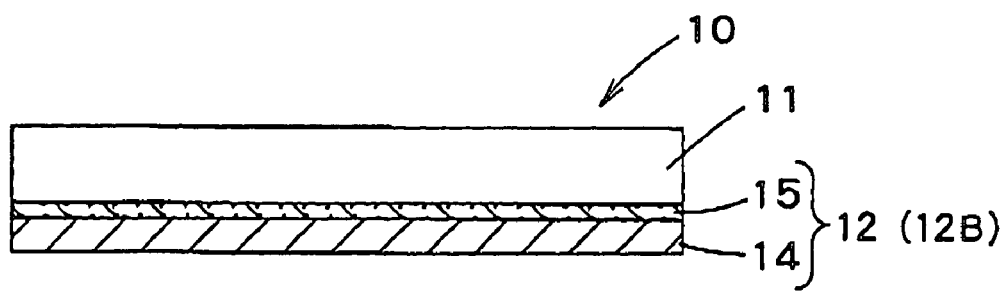
FIG. 5 is a diagrammatic sectional view showing a further modification of the projection screen body of the projection screen shown in FIG. 1.
Figure 6:
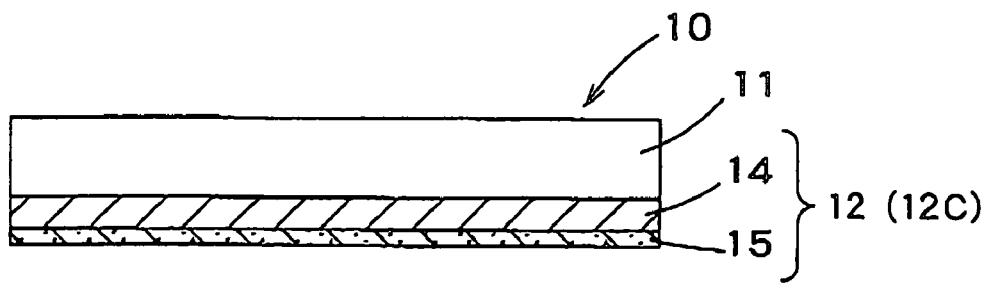
FIG. 6 is a diagrammatic sectional view showing a still further modification of the projection screen body of the projection screen shown in FIG. 1.

The embodiment of the substrate 12 (12A) is not limited to the one shown in FIG. 4. The substrate 12 (12B, 12C) may also be obtained in the following manner: a light-absorbing layer 15 comprising a black pigment or the like is formed on one surface of a transparent support film 14 such as a plastic film, as shown in FIGS. 5 and 6.

To make the substrate 12 windable, the thickness of the substrate 12 is preferably made 15 to 300 μm, more preferably 25 to 100 μm. On the other hand, when the substrate 12 is not required to have flexibility as in the case where a panel-type projection screen is produced, the thickness of the substrate 12 can be made great limitlessly.

Examples of plastic films that can be used as materials for the substrate 12 or the support film 14 include films of such thermoplastic polymers as polycarbonate polymers, polyester polymers including polyethylene terephthalate, polyimide polymers, polysulfone polymers, polyether sulfone polymers, polystyrene polymers, polyolefin polymers including polyethylene and polypropylene, polyvinyl alcohol polymers, cellulose acetate polymers, polyvinyl chloride polymers, polyacrylate polymers, and polymethyl methacrylate polymers. Materials for the substrate 12 are not limited to the above-described polymers, and it is also possible to use such materials as metals, paper, cloth and glass.

Lamination of the polarized-light selective reflection layer 11 to the substrate 12 is usually conducted by applying a cholesteric liquid crystalline composition and then subjecting the applied layer to aligning treatment and curing treatment, as will be described later.

In the above-described lamination process, since it is necessary to make the cholesteric liquid crystalline structure of the polarized-light selective reflection layer 11 not in the state of planar orientation, it is preferable to use, as the substrate 12, a material whose surface to which the liquid crystalline composition will be applied has no aligning power.

However, even when a material whose surface to which the liquid crystalline composition will be applied has aligning power like a stretched film is used as the substrate 12, the cholesteric liquid crystalline structure of the polarized-light selective reflection layer 11 can be made not in the state of planar orientation, if this surface of the material is subjected in advance to surface treatment, the components of the liquid crystalline composition are properly selected, or the process conditions under which the liquid crystalline composition is oriented are controlled.

Figure 7:
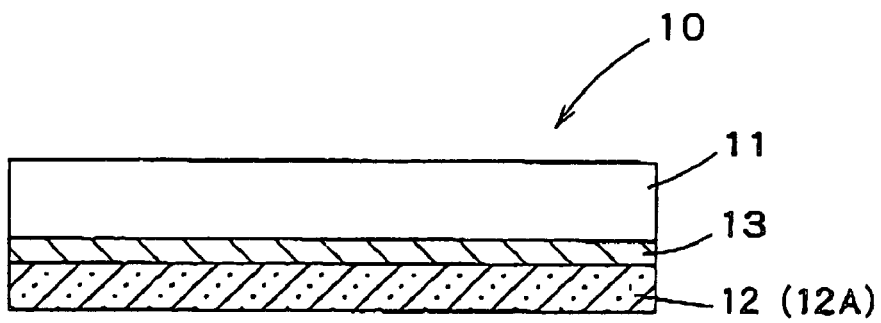
FIG. 7 is a diagrammatic sectional view showing a yet further modification of the projection screen body of the projection screen shown in FIG. 1.

Further, even if a material whose surface to which the liquid crystalline composition will be applied has aligning power is used as the substrate 12, it is possible to control the orientation of the cholesteric liquid crystalline structure of the polarized-light selective reflection layer 11 by providing an intermediate layer 13, such as an adherent layer, between the substrate 12 (12A) and the polarized-light selective reflection layer 11, as shown in FIG. 7, thereby directing, to a plurality of directions, the directors of liquid crystalline molecules constituting the cholesteric liquid crystalline structure of the polarized-light selective reflection layer 11, existing in the vicinity of the intermediate layer 13. By providing an intermediate layer 13 such as an adherent layer, it is also possible to improve the adhesion between the polarized-light selective reflection layer 11 and the substrate 12. For such an intermediate layer 13, any material can be used as long as it is highly adherent to both the material for the polarized-light selective reflection layer 11 and the material for the substrate 12, and it is possible to use commercially available materials. Specific examples of materials that can be used for the intermediate layer 13 include an adherent-layer-containing PET film A4100 manufactured by Toyobo Co., Ltd., Japan and adherent materials AC-X, AC-L and AC-W manufactured by Panack Co., Ltd., Japan. A black pigment or the like may be incorporated in the intermediate layer 13, thereby using the intermediate layer 13 as a light-absorbing layer capable of absorbing light in the visible region, as in the case of the substrate 12 (12A) shown in FIG. 4.

In the case where the surface of the substrate 12 has no aligning power and the adhesion between the polarized-light selective reflection layer 11 and the substrate 12 is satisfactorily high, it is not always required to provide the intermediate layer 13. To improve the adhesion between the polarized-light selective reflection layer 11 and the substrate 12, a process-related method such as corona discharge treatment or UV cleaning may also be used.

A process of producing the above-described projection screen body 10 will be described hereinafter.

The substrate 12 to which the polarized-light selective reflection layer 11 will be laminated is firstly prepared. If necessary, the intermediate layer 13 such as an adherent layer is laminated to the surface of the substrate 12 on the side on which the polarized-light selective reflection layer 11 will be formed. The surface of the substrate 12 (the surface of the intermediate layer 13, if the intermediate layer 13 is present) to which a liquid crystalline composition will be applied is made to have no aligning power.

Thereafter, a cholesteric liquid crystalline composition is applied to the above-prepared substrate 12 and is then subjected to aligning treatment and curing treatment, whereby the polarized-light selective reflection layer 11 is laminated (fixed) to the substrate 12.

The steps (the steps of application, alignment and curing) for laminating (fixing) the polarized-light selective reflection layer 11 to the substrate 12 will be described in detail hereinafter.

(Step of Application)

In the step of application, a cholesteric liquid crystalline composition is applied to the substrate 12 to form thereon a cholesteric liquid crystal layer. Any of the known methods can be employed to apply the liquid crystalline composition to the substrate 12. Specifically, a roll, gravure, bar, slide, die, slit, or dip coating method can be used for this purpose. In the case where a plastic film is used as the substrate 12, a film coating method using a so-called roll-to-roll system may be used.

For the liquid crystalline composition that is applied to the substrate 12, a cholesteric, chiral nematic liquid crystal or a cholesteric liquid crystal may be used. Although any liquid crystalline material can be used as long as it can develop a cholesteric liquid crystalline structure, particularly preferable one for obtaining, after curing, an optically stable, polarized-light selective reflection layer 11 is a polymerizable liquid crystalline material having polymerizable functional groups at both ends of its molecule.

Explanation will be given below with reference to the case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material to make the resulting liquid crystalline composition cholesteric as a whole. To the liquid crystalline composition, a polymerization initiator and other proper additives are added.

Examples of polymerizable, nematic liquid crystalline materials include compounds represented by the following general formula (1) and formulae (2-i) to (2-xi). These compounds may be used either singly or in combination.

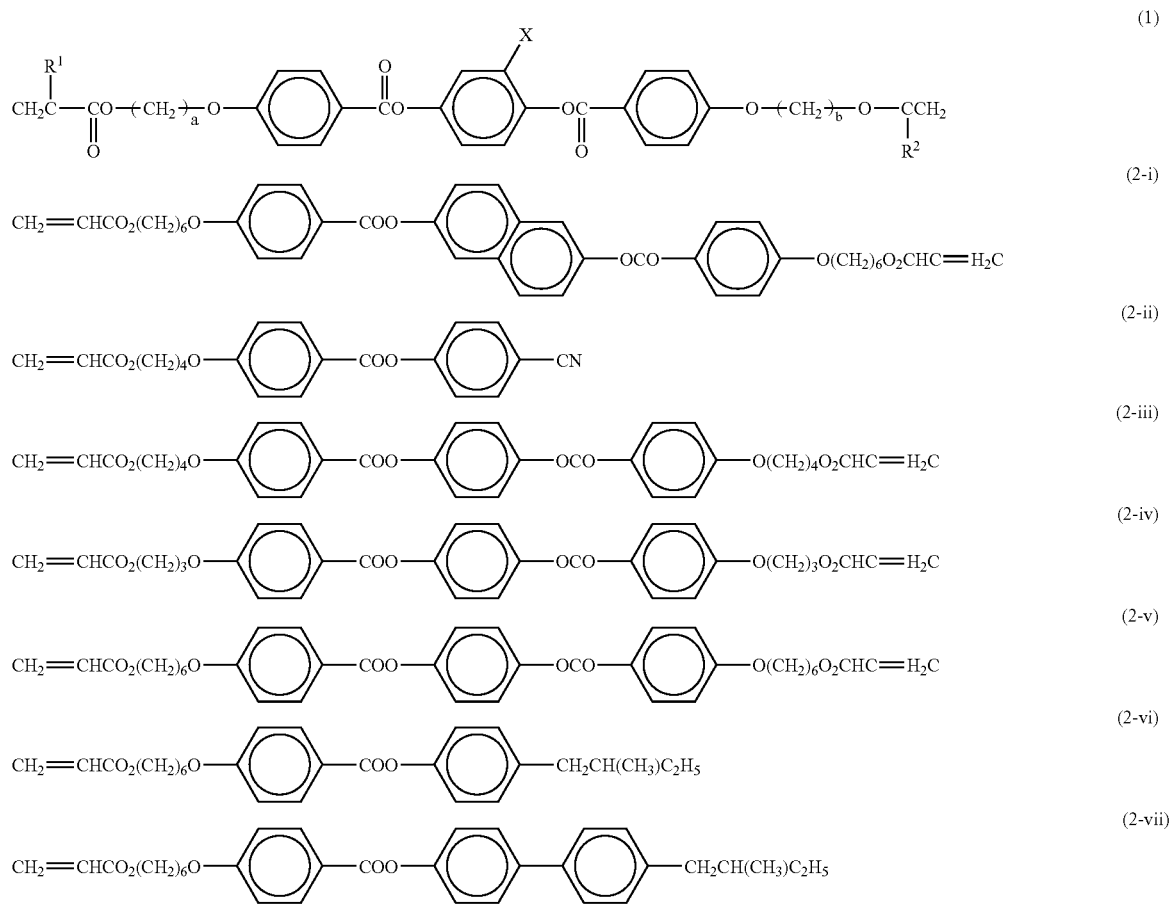

-continued

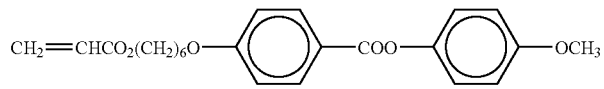
(2-viii)

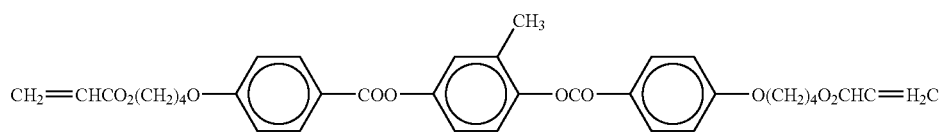
(2-ix)

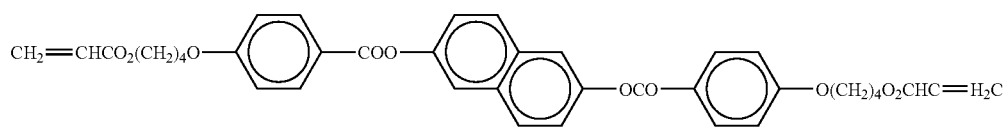
(2-x)

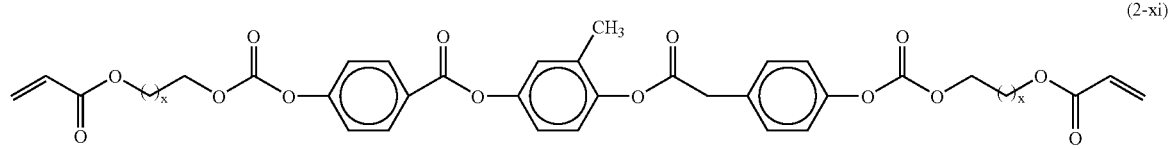
(2-xi)

wherein X is an integer of 2 to 5

In the above general formula (1), $R^1$ and $R^2$ independently represent hydrogen or methyl group. It is, however, preferable that both $R^1$ and $R^2$ represent hydrogen because a liquid crystalline composition containing such a compound shows a liquid crystal phase at temperatures in a wider range. X is hydrogen, chlorine, bromine, iodine, an alkyl group having 1 to 4 carbon atoms, methoxy group, cyano group or nitro group, preferably chlorine or methyl group. Further, in the above general formula (1), a and b that denote the chain lengths of the alkylene groups that serve as spacers between the (meth)acryloyloxy groups on both ends of the molecule and the aromatic rings are independently an integer of 2 to 12, preferably an integer of 4 to 10, more preferably an integer of 6 to 9. Those compounds represented by the general formula (1) in which a=b=0 are unstable, easily undergo hydrolysis, and have high crystallinity. On the other hand, those compounds represented by the general formula (1) in which a and b are independently an integer of 13 or more have low isotropic transition temperatures (TI's). Since these compounds show liquid crystal phases at temperatures in narrow ranges, they are undesirable.

Although a polymerizable liquid crystal monomer is, in the above description, used as the polymerizable, nematic liquid crystalline material, it is also possible to use, as the polymerizable, nematic liquid crystal material, a polymerizable liquid crystal oligomer or polymer, a liquid crystal polymer, or the like, properly selected from conventionally proposed ones.

On the other hand, the chiral agent is a low molecular weight compound containing an optically active site, having usually a molecular weight of not more than 1,500. The chiral agent is used in order to convert the positive mono-axially-nematic structure of a polymerizable, nematic liquid crystalline material into a helical structure. Any type of low molecular weight compounds capable of attaining the above purpose may be used as the chiral agent as long as it is compatible with the polymerizable, nematic liquid crystalline material in the state of solution or melt and can make the liquid crystalline structure helical without impairing the liquid crystallinity of the material.

The chiral agent that is used for making the structure of a liquid crystal helical is required to have any type of chirality at least in its molecule. Examples of chiral agents useful herein include those compounds having 1, or 2 or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals such as a chiral dopant liquid crystal "S-811" manufactured by Merck KGaA, Germany.

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is non-polymerizable, the liquid crystalline composition has reduced hardenability, and the cured film is poor in reliability. Moreover, the use of a large amount of a chiral agent having an optically active site boosts the cost of the liquid crystalline composition. Therefore, to form a polarized-light selective reflection layer having a cholesteric structure with a short helical pitch, it is preferable to select, as the optically-active-site-containing chiral agent to be incorporated in the liquid crystalline composition, a chiral agent whose helical structure-developing action is great. Specifically, it is preferable to use one of the compounds represented by the following general formulae (3), (4) and (5), which are low-molecular-weight compounds whose molecules are axially chiral.

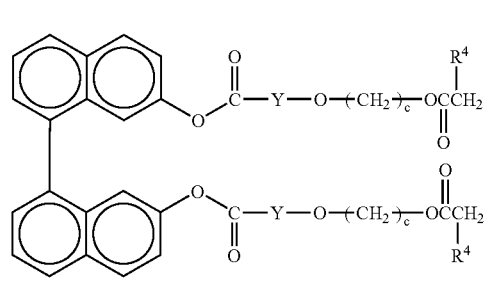
(3)
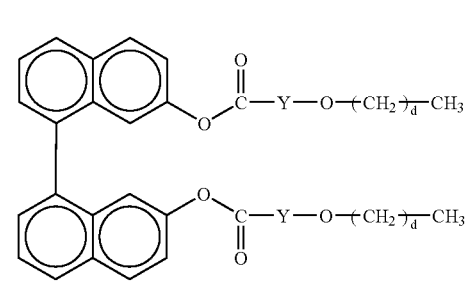
(4)
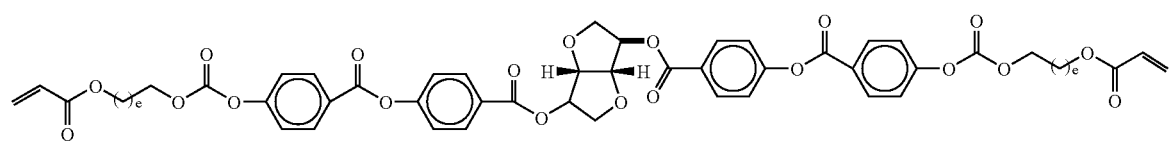
(5)
wherein e is an integer of 2 to 5
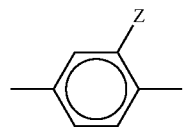
(i)
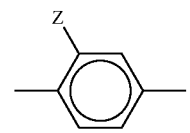
(ii)
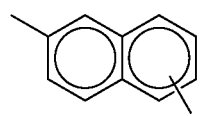
(iii)
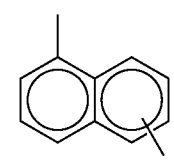
(iv)
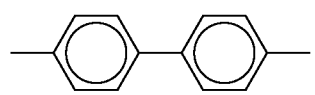
(v)
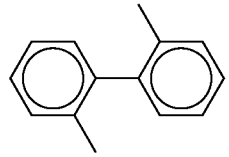
(vi)
(vii)
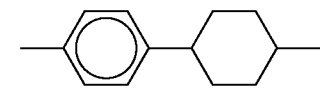
(viii)
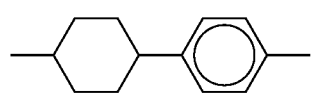
(ix)
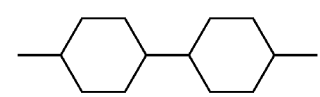
(x)
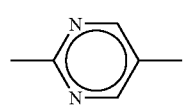
(xi)
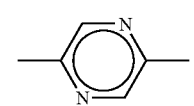
(xii)
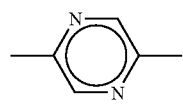
(xiii)

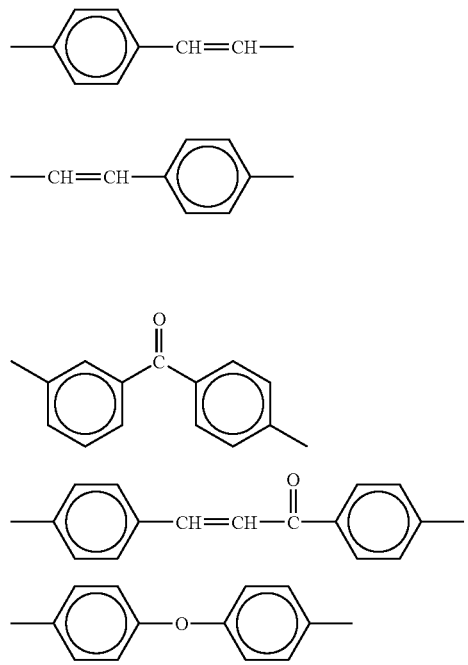

In the above general formulae (3) and (4), $R^4$ represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Those compounds represented by the above general formula (3) or (4) in which c or d is 0 or 1 are poor in stability, easily undergo hydrolysis, and have high crystallinity. On the other hand, those compounds represented by the general formula (3) or (4) in which c or d is 13 or more have low melting points (Tm's). These compounds are less compatible with the polymerizable, nematic liquid crystalline material, so that a liquid crystalline composition containing such a compound as the chiral agent may cause phase separation depending on the concentration of the compound.

The chiral agent is not necessarily polymerizable. However, if the chiral agent is polymerizable, it is polymerized with the polymerizable, nematic liquid crystalline material to give a stably fixed cholesteric structure. Therefore, from the viewpoints of thermal stability and the like, it is highly desirable that the chiral agent be polymerizable. In particular, the use of a chiral agent having polymerizable functional groups at both ends of its molecule is preferred for production of a polarized-light selective reflection layer 11 excellent in heat resistance.

The content of the chiral agent in the liquid crystalline composition is optimally decided in consideration of the helical structure-developing ability of the chiral agent, the cholesteric liquid crystalline structure of the resulting polarized-light selective reflection layer 11, and so forth. Although the amount of the chiral agent to be added greatly varies depending upon the components of the liquid crystalline composition, it is from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. In the case where the amount of the chiral agent added is smaller than this range, there is a possibility that the liquid crystalline composition cannot fully become cholesteric. On the other hand, when the amount of the chiral agent added exceeds the above-described range, the alignment of liquid crystalline molecules is impeded, which may adversely affect the curing of the liquid crystalline composition that is conducted by the application of activating radiation or the like.

Although the liquid crystalline composition can be applied as it is to the substrate 12, it may be dissolved in a suitable solvent such as an organic solvent to give an ink in order to make the viscosity of the liquid crystalline composition fit for an applicator or to attain excellent alignment of liquid crystalline molecules.

Although any solvent can be used for the above purpose as long as it can dissolve the above-described polymerizable liquid crystalline material, it is preferable that the solvent does not attack the substrate 12. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted to any degree. However, considering that a liquid crystal itself is a material having low solubility and high viscosity, it is preferable to dilute the polymerizable liquid crystalline material to such a degree that the content of the liquid crystalline material in the diluted solution is in the order of preferably 5 to 50%, more preferably 10 to 30%.

(Step of Alignment)

After applying the liquid crystalline composition to the substrate 12 to form thereon a cholesteric liquid crystal layer in the above-described step of application, the cholesteric liquid crystal layer is, in the step of alignment, held at a predetermined temperature at which the cholesteric liquid crystal layer develops a cholesteric liquid crystalline structure, thereby aligning liquid crystalline molecules in the cholesteric liquid crystal layer.

The cholesteric liquid crystalline structure of the polarized-light selective reflection layer 11 that should be finally obtained is one not in such a state of planar orientation as is shown in FIG. 2B but in such a state of orientation as is shown in FIG. 2A, in which a plurality of the helical structure parts 30 that are different in the direction of the helical axis L are present. Even so, it is necessary to conduct alignment treatment. Namely, although it is not necessary to conduct alignment treatment for aligning, in one direction on the substrate 12, the directors of liquid crystalline molecules in the cholesteric liquid crystalline structure, it is necessary to conduct such alignment treatment as to produce a plurality of the helical structure parts 30 in the cholesteric liquid crystalline structure.

When the cholesteric liquid crystal layer formed on the substrate 12 is held at a predetermined temperature at which the cholesteric liquid crystal layer develops a cholesteric liquid crystalline structure, it shows a liquid crystal phase. At this time, owing to the self-accumulating action of liquid crystalline molecules themselves, continuous rotation of the directors of the liquid crystalline molecules occurs in the direction of the thickness of the layer, and a helical structure is produced. It is possible to fix this cholesteric liquid crystalline structure in a liquid crystal phase state by curing the cholesteric liquid crystal layer using such a technique as will be described later.

In the case where the liquid crystalline composition applied to the substrate 12 contains a solvent, the step of alignment is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time (heating time) is preferably from 15 to 600 seconds, more preferably from 30 to 180 seconds. After once conducting the drying treatment, if it is realized that the liquid crystal layer is not fully orientated, this layer may be further heated accordingly. In the case where this drying treatment is conducted by means of vacuum drying, it is preferable to separately conduct heat treatment in order to align liquid crystalline molecules.

(Step of Curing)

After aligning liquid crystalline molecules in the cholesteric liquid crystal layer in the above-described step of alignment, the cholesteric liquid crystal layer is cured in the step of curing, thereby fixing the cholesteric liquid crystalline structure that has been developed in the liquid crystal phase state.

To effect the step of curing, it is possible to use: (1) a method in which the solvent contained in the liquid crystalline composition is evaporated; (2) a method in which liquid crystalline molecules in the liquid crystalline composition are thermally polymerized; (3) a method in which liquid crystalline molecules in the liquid crystalline composition are polymerized by the application of radiation; or (4) any combination of these methods.

Of the above methods, the method (1) is suitable for the case where a liquid crystal polymer is used as the polymerizable, nematic liquid crystalline material that is incorporated in the liquid crystalline composition for forming the cholesteric liquid crystal layer. In this method, the liquid crystal polymer is dissolved in a solvent such as an organic solvent, and this solution is applied to the substrate 12. In this case, a solidified, cholesteric liquid crystal layer can be obtained by simply removing the solvent by drying. The type of the solvent, the drying conditions, and so on are the same as those ones in the aforementioned steps of application and alignment.

The above-described method (2) is for curing the cholesteric liquid crystal layer by thermally polymerizing liquid crystalline molecules in the liquid crystalline composition by heating. In this method, the state of bonding of the liquid crystalline molecules varies according to heating (baking) temperature. Therefore, if the cholesteric liquid crystal layer is heated non-uniformly, the cured layer cannot be uniform in physical properties such as film hardness and in optical properties. In order to limit variations in film hardness to ±10%, it is preferable to control the heating temperature so that it varies only within ±5%, preferably ±2%.

Any method may be employed to heat the cholesteric liquid crystal layer formed on the substrate 12 as long as it can provide uniformity in heating temperature. The liquid crystal layer may be placed directly on a hot plate and held as it is, or placed indirectly on a hot plate with a thin air layer interposed between the liquid crystal layer and the hot plate and held in parallel with the hot plate. Besides, a method using a heater capable of entirely heating a particular space, such as an oven, may be employed. In this case, the liquid crystal layer is placed in or passed through such a heater. If a film coater or the like is used, it is preferable to make the drying zone long enough to make the heating time sufficiently long.

The heating temperature required is usually as high as 100° C. or more. However, considering the heat resistance of the substrate 12, it is preferable to limit this temperature to below approximately 150° C. If a film or the like specialized with respect to heat resistance is used as the substrate 12, the heating temperature can be made as high as above 150° C.

The above-described method (3) is for curing the cholesteric liquid crystal layer by photo-polymerizing liquid crystalline molecules in the liquid crystalline composition by the application of radiation. In this method, electron beams, ultraviolet rays, or the like fitting for the conditions can be used as the radiation. In general, ultraviolet light is preferred because of the simplicity of ultraviolet light irradiation systems, and so forth. The wavelength of ultraviolet light useful herein is from 250 to 400 nm. If ultraviolet light is used, it is preferable to incorporate a photopolymerization initiator in the liquid crystalline composition in advance.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-choloro-4-propoxythioxanthone. In addition to photopolymerization initiators, sensitizers may be added to the liquid crystalline composition unless they hinder the attainment of the object of the present invention.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

By effecting a series of the above-described steps (steps of application, alignment and curing), it is possible to obtain a projection screen body 10 comprising a polarized-light selective reflection layer 11 composed of a single cholesteric liquid crystal layer. It is also possible to obtain a projection screen body 10 comprising a polarized-light selective reflection layer 11 composed of a plurality of cholesteric liquid crystal layers by repeatedly conducting a series of the above-described steps. For example, by repeatedly conducting these steps, it becomes possible to obtain such a projection screen body 10 as is shown in FIG. 3, comprising, as the polarized-light selective reflection layer 11, a partial selective reflection layer 11a that selectively reflects light in the blue (B) color wave range, a partial selective reflection layer 11b that selectively reflects light in the green (G) color wave range, and a partial selective reflection layer 11c that selectively reflects light in the red (R) color wage range that are successively laminated in this order to the substrate 12.

In this case, as long as the underlying cholesteric liquid crystal layer has been formed and solidified, a liquid crystalline composition for forming the second or later cholesteric liquid crystal layer can be applied by using the same technique as in the formation of the first cholesteric liquid crystal layer. Continuity is, in this case, produced between the cholesteric liquid crystalline structure (the state of orientation) of the upper cholesteric liquid crystal layer and that of the lower cholesteric liquid crystal layer. It is, therefore, unnecessary to provide an alignment-controlling layer or the like between these two cholesteric liquid crystal layers. However, an intermediate layer such as an adherent layer may be provided between these two cholesteric liquid crystal layers, as needed. In the formation of the second and later cholesteric liquid crystal layers, the conditions under which the step of application, alignment and curing are conducted and the materials that are used for forming the cholesteric liquid crystal layers are as mentioned above, so that explanation for them is herein omitted.

Thus, the projection screen body 10 comprises the polarized-light selective reflection layer 11 having a cholesteric liquid crystalline structure, capable of selectively reflecting a specific polarized-light component, and, owing to structural non-uniformity in the cholesteric liquid crystalline structure that is brought about, for example, by helical structure parts 30 whose helical axes L extend in different directions, it diffuses light that is selectively reflected.

The polarized-light selective reflection layer 11 selectively reflects only a specific polarized-light component (e.g., right-handed circularly polarized light) owing to the polarized-light-separating property of the cholesteric liquid crystalline structure, so that the polarized-light selective reflection layer 11 can be made to reflect only approximately 50% of the unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the polarized-light selective reflection layer 11 selectively reflects (e.g., right-handed circularly polarized light), the polarized-light selective reflection layer 11 can reflect nearly 100% of the imaging light projected, that is, the polarized-light selective reflection layer 11 can efficiently reflect the imaging light.

Furthermore, since the polarized-light selective reflection layer 11 has a structurally non-uniform, cholesteric liquid crystalline structure in which the helical structure parts 30 have helical axes extending in different directions, this layer 11 reflects imaging light not by specular reflection but by diffuse reflection, and the reflected light can thus be well recognized as an image. At this time, owing to structural non-uniformity in the cholesteric liquid crystalline structure, the polarized-light selective reflection layer 11 diffuses light that is selectively reflected, so that it can reflect a specific polarized-light component (e.g., right-handed circularly polarized light 31R in the selective reflection wave range) while diffusing it, and, at the same time, transmits the other light components (e.g., left-handed circularly polarized light 31L in the selective reflection wave range, and right-handed circularly polarized light 32R and left-handed circularly polarized light 32L not in the selective reflection wave range) without diffusing them. For this reason, the environmental light and imaging light that pass through the polarized-light selective reflection layer 11 do not undergo the previously-mentioned "depolarization" and it is thus possible to improve image visibility while maintaining the polarized-light-separating property inherent in the polarized-light selective reflection layer 11.

Thus, according to the above-described projection screen body 10, it is possible to increase image contrast by suppressing the influence of environmental light such as sunlight and light from lighting fixtures by making use of the polarized-light-separating property of the cholesteric liquid crystal structure, and, at the same time, to diffuse the imaging light that is reflected, without lowering image visibility, by making use of structural non-uniformity in the cholesteric liquid crystalline structure. The projection screen body 10 can therefore sharply display an image even under bright environmental light.

Further, according to the above-described projection screen body 10, the polarized-light selective reflection layer 11 is made to selectively reflect light in a specific wave range that covers only a part of the visible region. It is, therefore, possible to further suppress the influence of environmental light such as sunlight and light from lighting fixtures to increase image contrast, thereby further improving image visibility.

Figure 8:
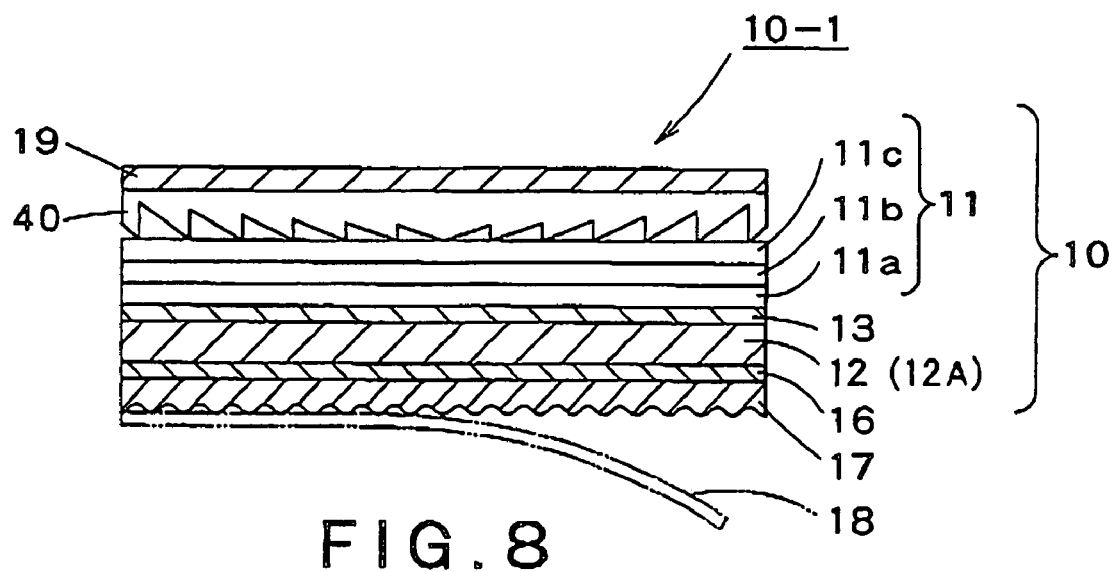
FIG. 8 is a diagrammatic sectional view showing another modification of the projection screen shown in FIG. 1.

In the above-described projection screen body 10, a light-reflecting layer 16 for reflecting light incident on the substrate 12 may be provided on the surface of the substrate 12 opposite to the side on which the polarized-light selective reflection layer 11 is provided, as shown in FIG. 8. When a light-reflecting layer 16 is provided on the substrate 12 that contains a light-absorbing layer in such a manner as is shown in FIG. 4, 5 or 6, environmental light such as sunlight and light from lighting fixtures entering, from the back side, the projection screen 10-1 comprising the projection screen body 10 can be effectively reflected before reaching the substrate 12 (especially, the light-absorbing layer contained in the substrate 12). It is, therefore, possible to effectively prevent the substrate 12 from generating heat. Preferable examples of materials for the light-reflecting layer 16 include white-colored scattering layers (paper, white-colored films, coatings, etc.), metallic plates, and aluminum power films.

Further, as shown in FIG. 8, a pressure-sensitive adhesive layer 17 useful for affixing, to an external member, the substrate 12 on which the polarized-light selective reflection layer 11 is formed may be provided on the substrate 12 opposite to the side on which the polarized-light selective reflection layer 11 is provided (on the backside of the light-reflecting layer 16 in FIG. 8). If a pressure-sensitive adhesive layer 17 is so provided, the projection screen 10-1 comprising the projection screen body 10 can be affixed to an external member such as a white board or wall, if necessary. The pressure-sensitive adhesive layer 17 is preferably a layer that can separably adhere, to an external member, the substrate 12 on which the polarized-light selective reflection layer 11 is formed. It is, therefore, preferable to use, as the pressure-sensitive adhesive layer 17, a pressure-sensitive adhesive film with slight tackiness such as a releasable, pressure-sensitive adhesive film (manufactured by Panack Co., Ltd., Japan). Moreover, it is preferable to cover the surface of the pressure-sensitive adhesive layer 17 with a releasing film 18 in order to protect the pressure-sensitive adhesive layer 17 before use.

Furthermore, as shown in FIG. 8, a functional layer 19 may be provided on the observation side surface of the projection screen 10-1 comprising the projection screen body 10 (the observation side surface of the circular Fresnel lens 40 that is provided on the observation side of the projection screen body 10). A variety of layers including hard coat (HC) layers, anti-glaring (AG) layers, anti-reflection (AR) layers, ultraviolet-light-absorbing (UV-absorbing) layers, and antistatic (AS) layers can be used as the functional layer 19.

The hard coat (HC) layer is for protecting the surface of the projection screen 10-1 and preventing it from being scratched or staining. The anti-glaring (AG) layer is for preventing the projection screen 10-1 from glaring. The anti-reflection (AR) layer is for preventing the surface of the projection screen 10-1 from reflecting light. The ultraviolet-light-absorbing (UV-absorbing) layer is for absorbing the ultraviolet light component of light incident on the projection screen 10-1, the UV component causing yellowing of the liquid crystalline composition. The antistatic (AS) layer is for removing static electricity that is generated in the projection screen 10-1. In the case where the antistatic layer is used as the functional layer 19, this layer is not always provided on the observation side surface of the projection screen 10-1 (on the observation side surface of the circular Fresnel lens 40 that is provided on the observation side of the projection screen body 10), and may be provided on the back surface of the substrate 12. Moreover, carbon particles or the like may be incorporated in the substrate 12, thereby imparting, to the substrate 12 itself, the property of removing static electricity.

The functional layer 19 that is used as an anti-glaring layer acts to prevent the surface of the projection screen 10-1 from mirroring viewers and their surroundings, and is significant for clear image recognition. A transparent layer with a roughened surface is conveniently used as the anti-glaring layer, and by the use of such a layer, it is possible to effectively prevent mirroring of objects that is caused by interfacial reflection on the surface of the projection screen 10-1. Such a transparent layer can be obtained by roughening the surface of a transparent resin, glass, or the like by such a method as sandblasting, transfer of the shape of a molding surface at the time of shaping the surface with a mold, or chemical treatment. The surface of a transparent layer may be roughened either irregularly or regularly. To maintain the polarized-light-separating property of the polarized-light selective reflection layer 11, it is preferable that the anti-glaring layer be isotropic with respect to refractive index. Examples of materials useful for the anti-glaring layer include glass, resins such as acrylic resins and polyester resins, and TAC (triacetyl cellulose) films with matte surfaces.

[Optical Member]

The circular Fresnel lens (optical member) 40 that is provided on the observation side of the above-described projection screen body 10 will be described hereinafter.

Figure 9:
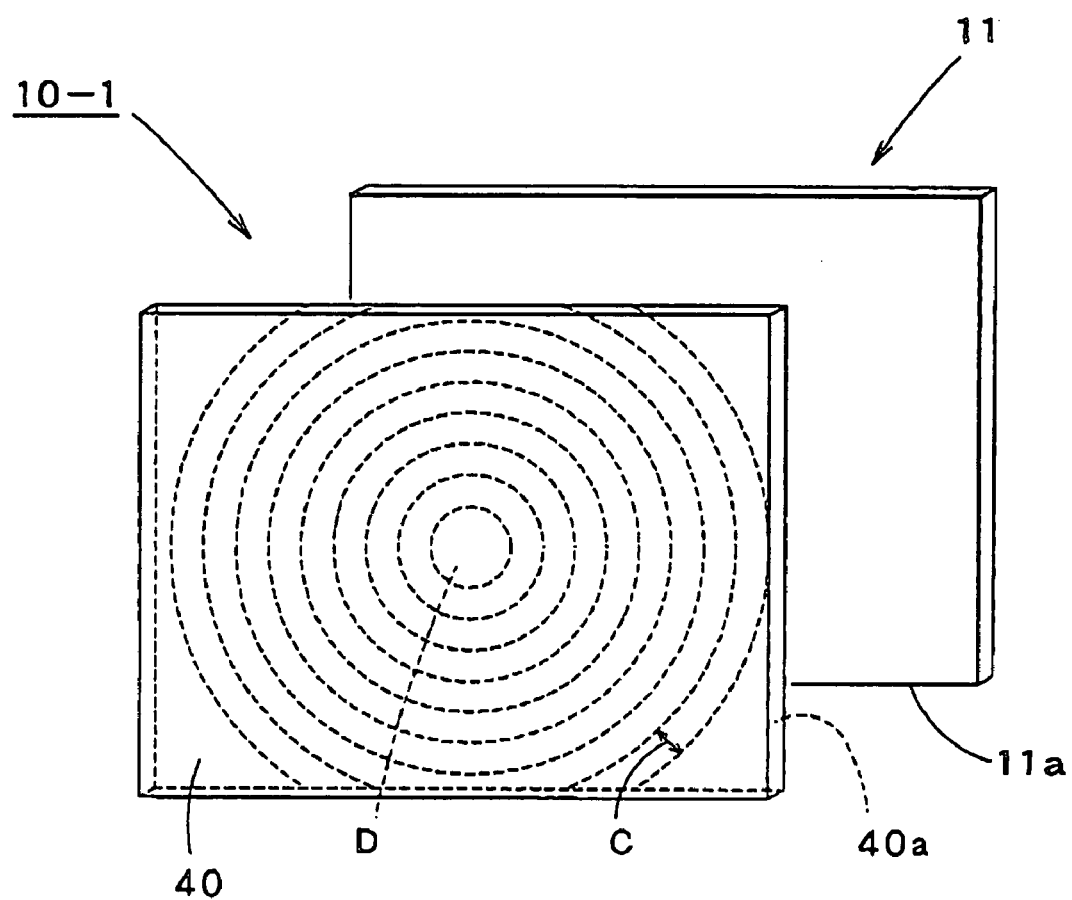
FIG. 9 is a diagrammatic perspective view for explaining the projection screen shown in FIG. 1.

The construction of the circular Fresnel lens 40 will firstly be described with reference to FIGS. 1 and 9. FIG. 9 is a diagrammatic perspective view showing the main components (the polarized-light selective reflection layer 11 and the circular Fresnel lens 40) of the projection screen 10-1 shown in FIG. 1.

As shown in FIGS. 1 and 9, the circular Fresnel lens 40 is provided on the observation side of the polarized-light selective reflection layer 11, where the back surface of the circular Fresnel lens 40 (the surface facing to the polarized-light selective reflection layer 11) is a lens face 40a in the shape of a circular Fresnel lens.

The lens face 40a has a plurality of grooves (e.g., 6,300 to 11,500 grooves), and the width C of each groove is from 0.075 to 0.112 mm, for example. The number of the grooves is determined by the size of the circular Fresnel lens 40 and the width C of each groove, and varies according to these size and width C. Further, on the lens face 40a, these grooves form the shape of a circular Fresnel lens, and the circular Fresnel lens 40 and the polarized-light selective reflection layer 11 are so arranged that the optical center D (see FIG. 9) of the concentric-circular grooves approximately agrees with the geometric center of the polarized-light selective reflection layer 11.

As long as the direction of the optical axis of imaging light can be controlled as desired, the circular Fresnel lens 40 may also be placed on the observation side of the polarized-light selective reflection layer 11 in such a manner that the center D of the concentric-circular grooves formed on the lens face 40a of the circular Fresnel lens 40 is deviated from the geometric center of the polarized-light selective reflection layer 11 toward the lower edge 11a side (see FIG. 9).

The optical function of the projection screen 10-1 comprising the circular Fresnel lens 40 of the above-described construction will be described with reference to FIGS. 10 to 12, wherein imaging light is projected from a projector 21 that is placed in the manner shown in FIG. 10.

Figure 10:
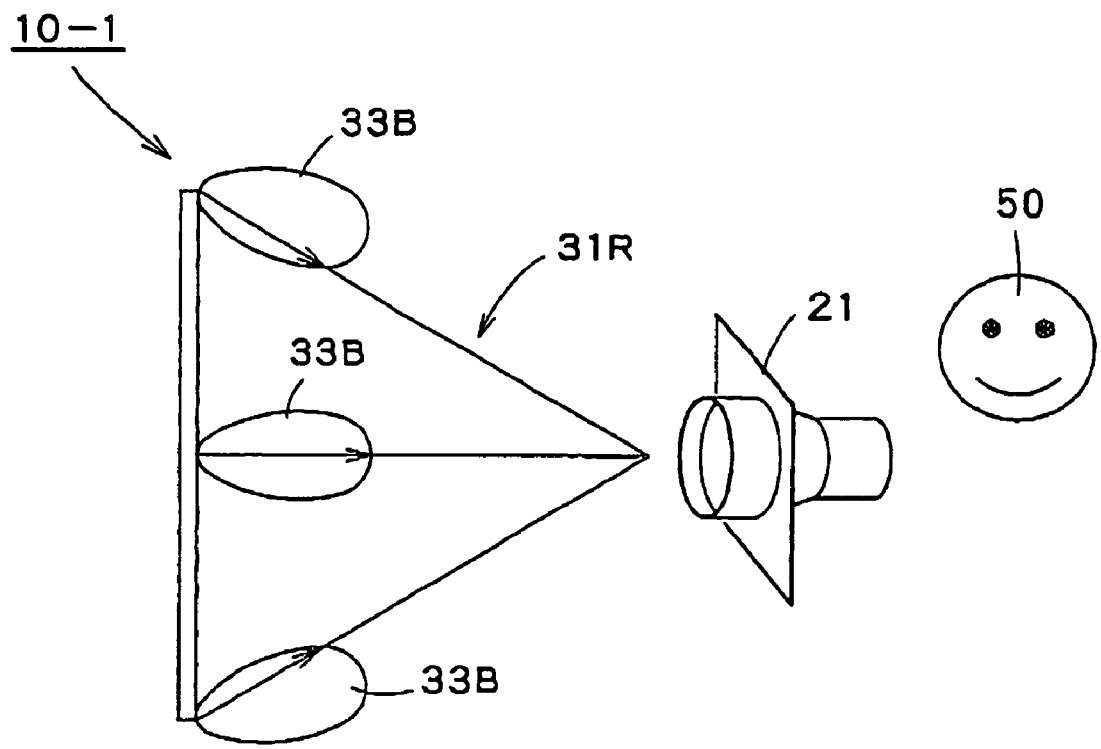
FIG. 10 is a view for explaining the concept of image display in a projection system using the projection screen shown in FIG. 1.

As shown in FIG. 10, the projector 21 is placed on the observation side of the projection screen 10-1 (the side from which a viewer 50 makes observation), around the normal to the center portion of the projection screen 10-1, and imaging light (right-handed circularly polarized light 31R in the selective reflection wave range) is projected on the entire surface of the projection screen 10-1 in the manner shown in FIG. 10. Therefore, the imaging light (right-handed circularly polarized light 31R) projected on the projection screen 10-1 from the projector 21 enters the projection screen 10-1 at different points and angles, as shown in FIGS. 10 to 12. Specifically, the imaging light enters the center portion of the projection screen 10-1 nearly vertically to it, while the imaging light enters the edge portion of the projection screen 10-1 obliquely to it. The angle at which the imaging light is incident on the edge portion of the projection screen 10-1 is determined by the size of the projection screen 10-1, the distance between the projection screen 10-1 and the projector 21, and so forth.

Figure 11:
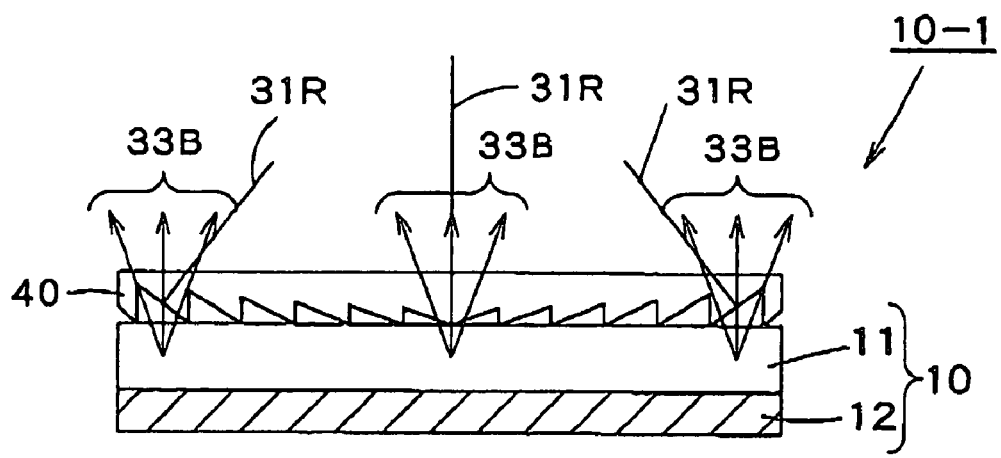
FIG. 11 is a diagrammatic sectional view for explaining the optical function of the projection screen shown in FIG. 1.
Figure 12:
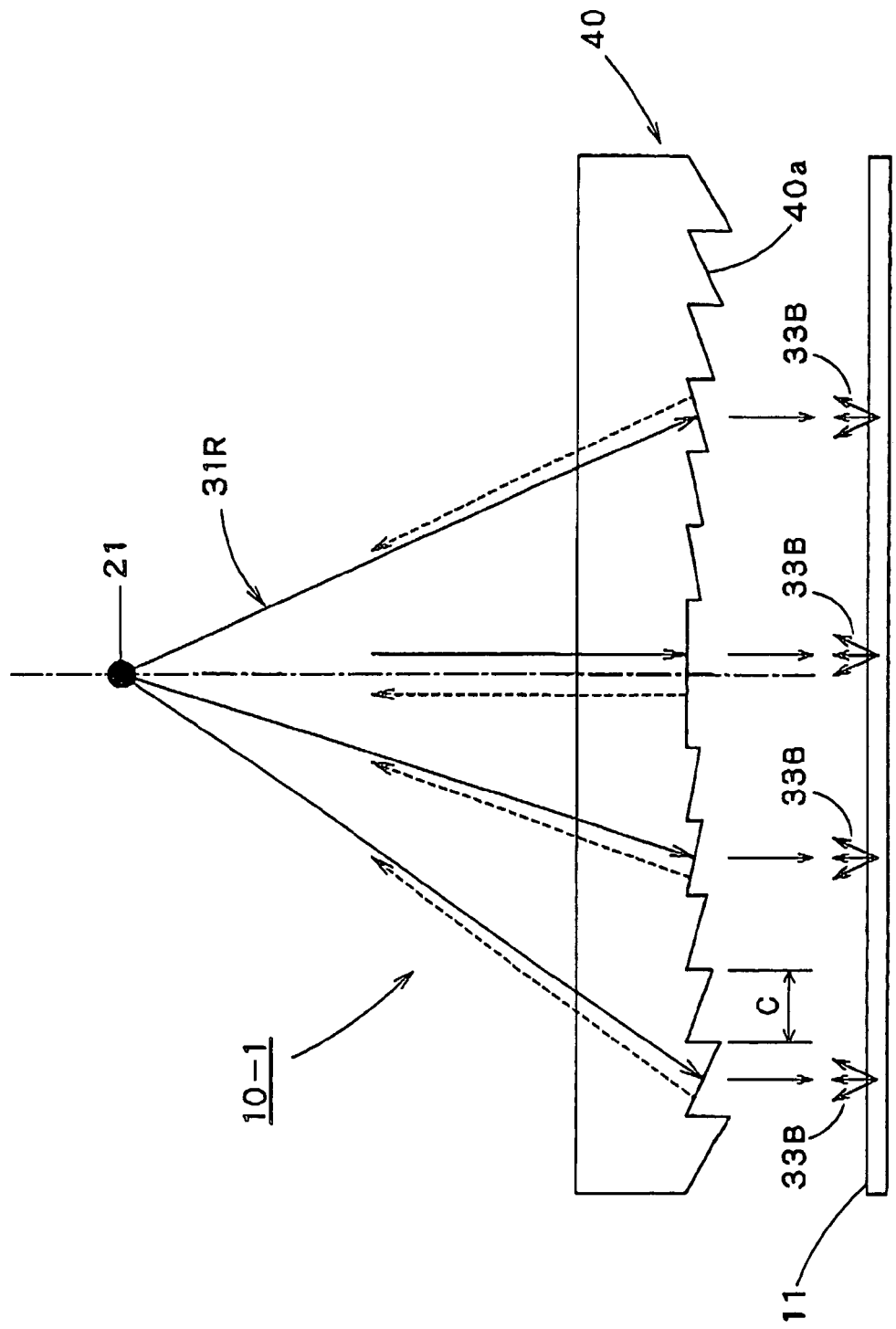
FIG. 12 is a view for explaining the sectional shape of and optical function of an optical member (circular Fresnel lens) in the projection screen shown in FIG. 1.

In the projection screen 10-1, the imaging light (right-handed circularly polarized light 31R) projected on the projection screen 10-1 at different points and angles enters the circular Fresnel lens 40, and the optical axis of the light is controlled by the lens face 40a, as shown in FIGS. 11 and 12. As a result, the imaging light (right-handed circularly polarized light 31R) that has passed through the circular Fresnel lens 40 enters the polarized-light selective reflection layer 11 nearly vertically to it, regardless of the point and angle at which the light has entered the circular Fresnel lens 40.

Specifically, the circular Fresnel lens 40 controls the direction in which the imaging light (right-handed circularly polarized light 31R) passes through the circular Fresnel lens 40 so that the direction in which the imaging light (right-handed circularly polarized light 31R) emerges from the circular Fresnel lens 40 is closer to the direction of the normal to the circular Fresnel lens 40 with respect to the direction in which the imaging light (right-handed circularly polarized light 31R) has entered the circular Fresnel lens 40.

The imaging light (right-handed circularly polarized light 31R) that has entered the polarized-light selective reflection layer 11 nearly vertically to it is diffused, as reflected light 33B, in directions included in an approximately constant range owing to the diffusing properties of the polarized-light selective reflection layer 11. Since the reflected light 33B is diffuse-reflected toward a particular observation point at which a viewer 50 makes observation, as shown in FIGS. 10 to 12, the viewer 50 can enjoy improved image visibility.

The optical axes of at least part of the reflected light 33B that are returned to the observation side as diffused light in the above-described manner are controlled by the lens face 40a of the circular Fresnel lens 40 so that the light are reflected toward the projector 21 (i.e., toward a particular observation point at which a viewer 50 makes observation) (see the broken lines in FIG. 12). Namely, the circular Fresnel lens 40, as a consequence, controls the angle at which the reflected light 33B emerges from the circular Fresnel lens 40 toward the observation side, whereby the direction in which the reflected light 33B emerges from the circular Fresnel lens 40 gets closer to the direction of the normal to the circular Fresnel lens 40 with respect to the direction in which the imaging light has entered the circular Fresnel lens 40. In other words, the circular Fresnel lens 40 controls the direction in which the imaging light (right-handed circularly polarized light 31R) emerges from the projection screen so that the light 33B diffuse-reflected from the polarized-light selective reflection layer 11 travels in a specific direction (in this case, toward the position of the projector 21 from where a viewer 50 makes observation) that is between the direction in which the imaging light (right-handed circularly polarized light 31R) has entered the polarized-light selective reflection layer 11 and the direction in which the incident light (right-handed circularly polarized light 31R) travels when specularly reflected.

Thus, the light 33B diffuse-reflected from the polarized-light selective reflection layer 11 in the projection screen 10-1 returns to a particular observation point at which a viewer 50 makes observation, regardless of the point (edge portion, center portion, etc.) at which the imaging light (right-handed circularly polarized light 31R) has entered the projection screen 10-1. For this reason, it is possible to effectively prevent the above-described projection screen 10-1 from suffering non-uniform brightness distribution or narrowed viewing angle that is brought about by differences in the point and angle at which imaging light projected from the projector 21 enters the projection screen 10-1.

For comparison, the optical function of the projection screen body 10, the remainder after removal of the circular Fresnel lens 40 from the projection screen 10-1, will be described with reference to FIGS. 13 and 14, wherein imaging light is projected on the projection screen body 10 from the projector 21 that is placed in the manner shown in FIG. 13.

Figure 13:
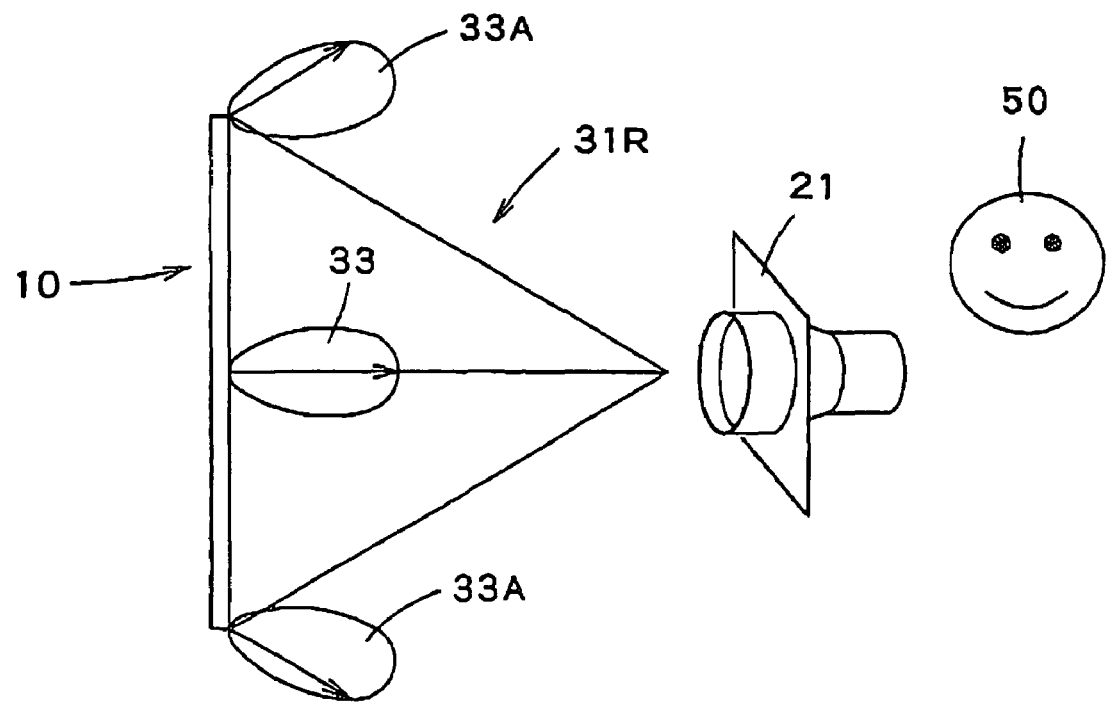
FIG. 13 is a view for explaining the concept of image display in the projection system using, as the projection screen, the projection screen body of the projection screen shown in FIG. 1.
Figure 14:
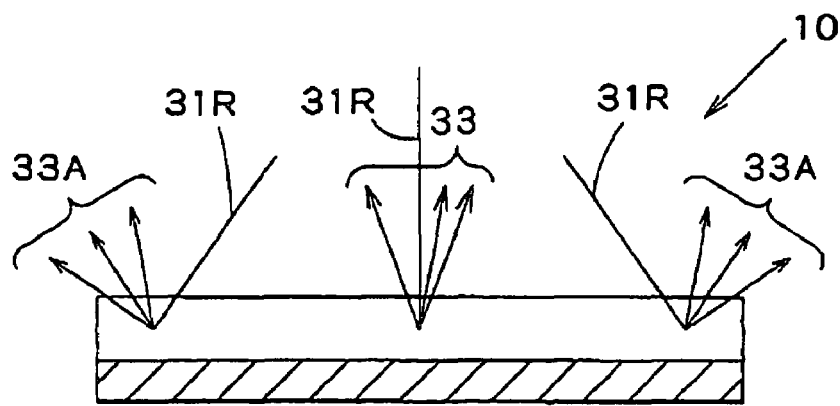
FIG. 14 is a diagrammatic sectional view for explaining the optical function of the projection screen for use in the projection system shown in FIG. 13.

As shown in FIG. 13, the projector 21 is placed on the observation side of the projection screen body 10 (the side from which a viewer 50 makes observation), around the normal to the center portion of the projection screen body 10, and imaging light (right-handed circularly polarized light 31R in the selective reflection wave range) is projected on the entire surface of the projection screen body 10 in the manner shown in FIG. 13. Therefore, the imaging light (right-handed circularly polarized light 31R) projected on the projection screen body 10 from the projector 21 enters the projection screen body 10 at different points and angles, as shown in FIGS. 13 and 14. Specifically, the imaging light enters the center portion of the projection screen body 10 nearly vertically to it, while the imaging light enters the edge portion of the projection screen body 10 obliquely to it. The angle at which the imaging light enters the edge portion of the projection screen body 10 varies depending upon the size of the projection screen body 10, the distance between the projection screen body 10 and the projector 21, and so forth.

In the projection screen body 10, the imaging light (right-handed circularly polarized light 31R) projected on the projection screen body 10 at different points and angles enters the polarized-light selective reflection layer 11 and is diffused as reflected light 33, 33A in directions included in an approximately constant range owing to the diffusing properties of the polarized-light selective reflection layer 11. At this time, the direction in which the imaging light (right-handed circularly polarized light 31R) projected on the projection screen body 10 from the projector 21 is diffuse-reflected, as reflected light 33, 33A, from the polarized-light selective reflection layer 11 varies depending upon the angle at which the light has entered the projection screen body 10, as shown in FIGS. 13 and 14. Of the reflected light, the light 33 diffuse-reflected from the center portion of the projection screen body 10 travels toward the front from where a viewer 50 makes observation. On the other hand, the light 33A diffuse-reflected from the edge portion of the projection screen body 10 travels outward from it (in the direction of specular reflection), so that it is difficult for the viewer 50 to recognize the reflected light 33A; that is, the edge portion of the projection screen body 10 appears dark.

Thus, the light 33, 33A diffuse-reflected from the polarized-light selective reflection layer 11 in the projection screen body 10 travels in a direction that varies depending upon the point (edge portion, center portion, etc.) at which the imaging light (right-handed circularly polarized light 31R) has entered the projection screen body 10. For this reason, the above-described projection screen body 10 shows non-uniform brightness distribution and narrowed viewing angle, depending upon the point and angle at which the imaging light projected from the projector 21 has entered the projection screen body 10.

In the above description, the projection screen 10-1 has been explained by referring to the case where the optical member that is provided on the observation side of the polarized-light selective reflection layer 11 (the projection screen body 10) is a circular Fresnel lens 40. Instead of the circular Fresnel lens 40, a linear Fresnel lens 41, 42 may be provided as in projection screens 10-2A to 10-2C shown in FIGS. 15A to 15C. In the following description, explanation for the constructions and functions of components common to the projection screens 10-2A to 10-2C and the projection screen 10-1 will be omitted.

Figure 15A:
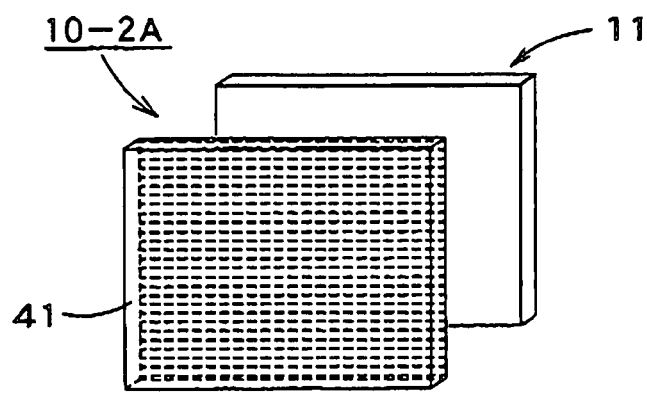
FIGS. 15A, 15B and 15C are diagrammatic perspective views showing modifications of the projection screen shown in FIG. 1.

As shown in FIG. 15A, the projection screen 10-2A comprises a linear Fresnel lens 41 provided on the observation side of the polarized-light selective reflection layer 11. The linear Fresnel lens 41 is that its back surface (the surface facing to the polarized-light selective reflection layer 11) is a lens face in the shape of a linear Fresnel lens. The linear-Fresnel-lens-shaped lens face has a plurality of linear grooves, which extend in such a direction that their longer direction agrees with the horizontal direction of the polarized-light selective reflection layer 11. Therefore, the linear Fresnel lens 41 controls the vertical optical axis of imaging light projected from a projector (not shown in the figure).

Figure 15B:
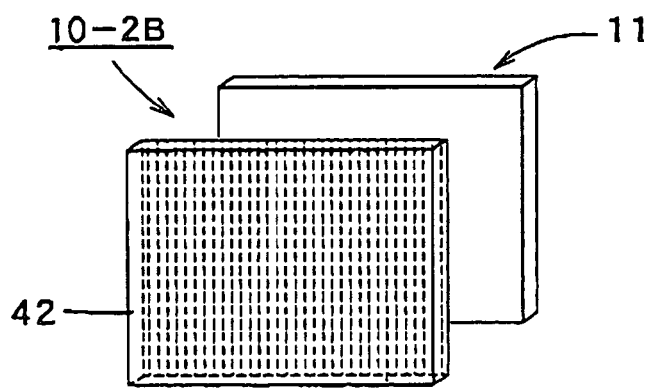

As shown in FIG. 15B, the projection screen 10-2B comprises a linear Fresnel lens 42 provided on the observation side of the polarized-light selective reflection layer 11. The linear Fresnel lens 42 is that its back surface (the surface facing to the polarized-light selective reflection layer 11) is a lens face in the shape of a linear Fresnel lens. The linear-Fresnel-lens-shaped lens face has a plurality of linear grooves, which extend in such a direction that their longer direction agrees with the vertical direction of the polarized-light selective reflection layer 11. Therefore, the linear Fresnel lens 42 controls the horizontal optical axis of imaging light projected from a projector (not shown in the figure).

Figure 15C:
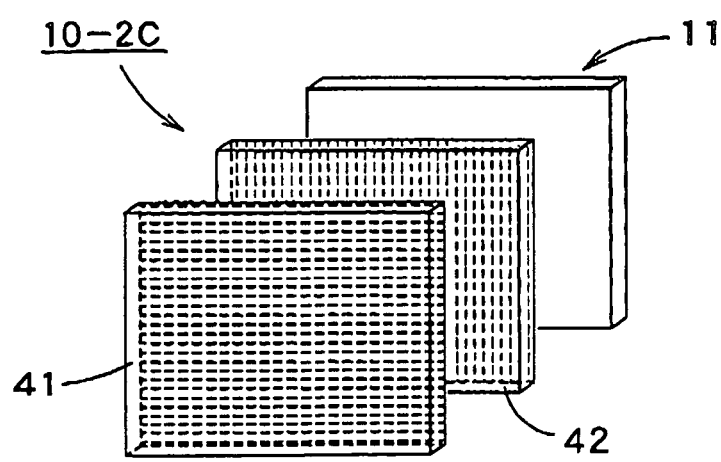

As shown in FIG. 15C, the projection screen 10-2C comprises the linear Fresnel lenses 41 and 42 provided on the observation side of the polarized-light selective reflection layer 11. The linear Fresnel lenses 41 and 42 are laminated to each other, and this laminate has almost the same optical properties as those of the aforementioned circular Fresnel lens 40 (see FIG. 9). Therefore, the linear Fresnel lenses 41 and 42 control the optical axis of imaging light both vertically and horizontally so that the imaging light enters the polarized-light selective reflection layer 11 nearly vertically to it.

Instead of the above-described Fresnel lens 40, 41, 42 having a Fresnel-lens-shaped lens face, a so-called prism lens may be used as long as it can control the optical axis of imaging light so that the imaging light enters the polarized-light selective reflection layer 11 nearly vertically to it. In particular, in the case where imaging light is obliquely projected on the polarized-light selective reflection layer 11 from the upper or lower side, a prism lens is advantageous because it can accurately control the optical axis of the imaging light.

Figure 16:
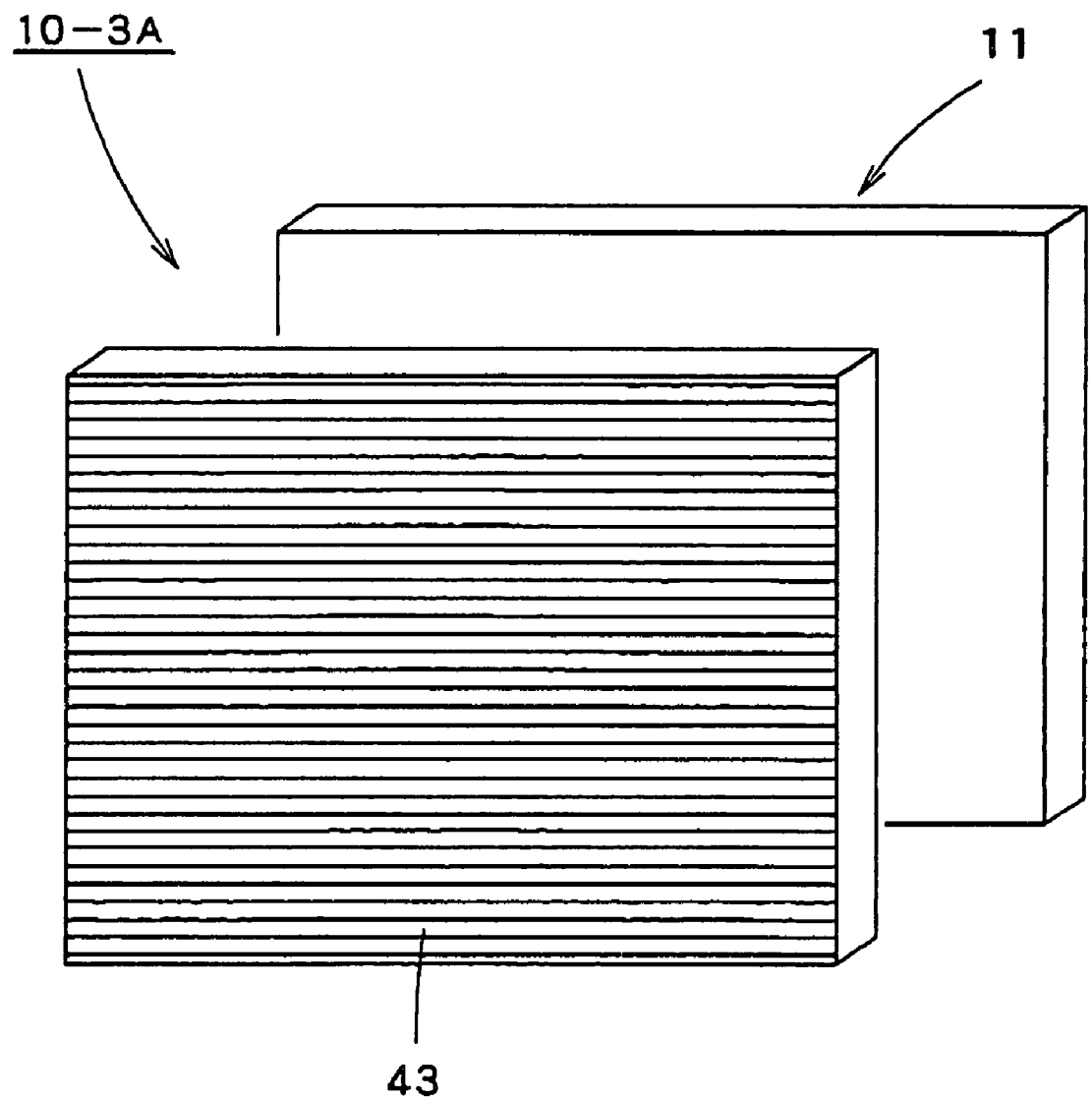
FIG. 16 is a diagrammatic perspective view showing a projection screen according to another embodiment of the present invention.

Further, although the projection screens 10-1, 10-2A, 10-2B and 10-2C have been described by referring to the case where the optical member that is provided on the observation side of the polarized-light selective reflection layer 11 (the projection screen body 10) is a Fresnel lens 40, 41 or 42, even when a lenticular lens 43 is used instead of the Fresnel lens 40, 41 or 42 as in a projection screen 10-3A shown in FIG. 16, there can be obtained the same actions and effects as in the case of the projection screens 10-1 and 10-2A to 10-2C. In the following description, explanation for the constructions and functions of components common to the projection screen 10-3A and the projection screens 10-1 and 10-2A to 10-2C will be omitted.

As shown in FIG. 16, the projection screen 10-3A has a lenticular lens 43 on the observation side of the polarized-light selective reflection layer 11. The lenticular lens 43 is that its both surfaces are lens faces in the shape of a lenticular lens for vertical diffusion. Each lenticular-lens-shaped lens face has a plurality of linear, semi-cylindrical lenses, which extend in such a direction that their longer direction agrees with the horizontal direction of the polarized-light selective reflection layer 11. Therefore, the lenticular lens 43 controls the vertical optical axis of imaging light that is projected from a projector (not shown in the figure) and is diffuse-reflected from the polarized-light selective reflection layer 11, thereby controlling the angle of emergence of the imaging light, and, at the same time, diffusing the imaging light directionally with respect to vertical direction. Further, the lenticular lens 43 can also control the optical axis of imaging light projected from a projector (not shown in the figure), thereby controlling the vertical angle at which the imaging light enters the polarized-light selective reflection layer 11.

The lenticular lens 43 will be described hereinafter in detail.

The function of controlling the vertical angle at which the imaging light is incident on the polarized-light selective reflection layer 11 will be described as a function of the lenticular lens 43.

Figure 17A:
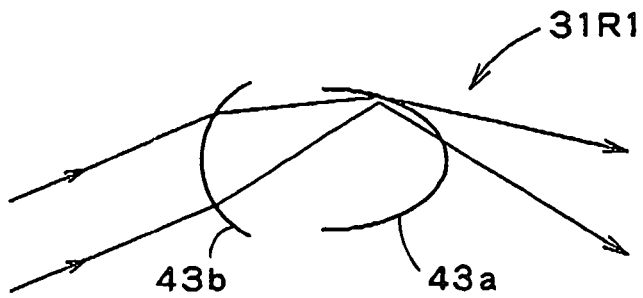
FIGS. 17A, 17B and 17C are views showing optical paths at particular points on the optical member (lenticular lens) in the projection screen shown in FIG. 16.
Figure 17B:
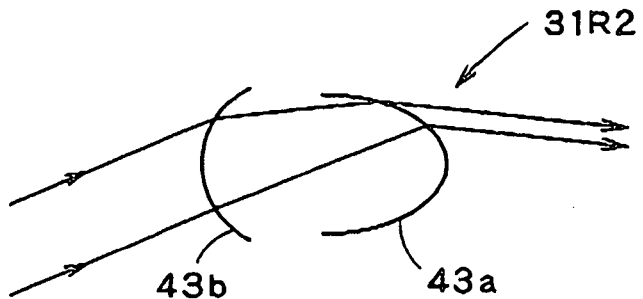
Figure 17C:
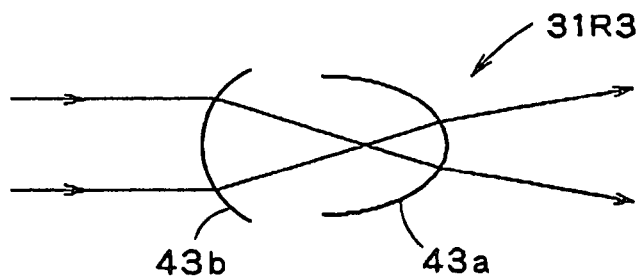

FIGS. 17A to 17C are views showing optical paths at particular points on the lenticular lens 43 in the projection screen 10-3A shown in FIG. 16.

As shown in FIGS. 17A to 17C, the lenticular lens 43 has, on the back surface facing to the polarized-light selective reflection layer 11 (situated on the right side in the figure), a first lenticular lens 43a, and, on the observation side surface, a second lenticular lens 43b. The first lens 43a has a curvature radius smaller than that of the second lens 43b and is therefore curved more greatly than the second lens 43b, as shown in FIGS. 17A to 17C.

The lenticular lens 43 shown in FIG. 17A corresponds to the edge portion of the polarized-light selective reflection layer 11 (situated on the right side in the figure). Referring to FIGS. 16 and 17A, imaging light 31R1 projected from a projector (not shown in the figure) is refracted at the second lens 43b, is then totally reflected from the first lens 43a, and finally enters the polarized-light selective reflection layer 11. Namely, the lenticular lens 43 controls the angle at which the imaging light 31R1 enters the polarized-light selective reflection layer 11. Specifically, the optical path which the imaging light 31R1 follows to enter the polarized-light selective reflection layer 11 is inclined toward the center of the polarized-light selective reflection layer 11, as shown in FIG. 17A.

The lenticular lens 43 shown in FIG. 17B corresponds to a portion between the edge and center portions of the polarized-light selective reflection layer 11 (situated on the right side in the figure). Referring to FIGS. 16 and 17B, imaging light 31R2 projected from a projector (not shown in the figure) is refracted at the second lens 43b, is then refracted at the first lens 43a, and finally enters the polarized-light selective reflection layer 11. Namely, the lenticular lens 43 controls the angle at which the imaging light 31R2 enters the polarized-light selective reflection layer 11. Specifically, the optical path which the imaging light 31R2 follows to enter the polarized-light selective reflection layer 11 is inclined toward the center of the polarized-light selective reflection layer 11, as shown in FIG. 17B, but the inclination of this optical path is not so sharp as that of the optical path which the imaging light 31R1 follows.

The lenticular lens 43 shown in FIG. 17C corresponds to the center portion of the polarized-light selective reflection layer 11 (situated on the right side in the figure). Referring to FIGS. 16 and 17C, imaging light 31R3 projected from a projector (not shown in the figure) is refracted at the second lens 43*b*, is then refracted at the first lens 43*a*, and finally enters the polarized-light selective reflection layer 11. Namely, the lenticular lens 43 controls the angle at which the imaging light 31R3 enters the polarized-light selective reflection layer 11. Specifically, the imaging light 31R3 enters the polarized-light selective reflection layer 11 nearly vertically to it, as shown in FIG. 17C.

Next, the function of controlling the angle at which the light reflected from the polarized-light selective reflection layer 11 (diffused light) emerges toward the observation side will be described as a function of the lenticular lens 43.

Figure 17D:
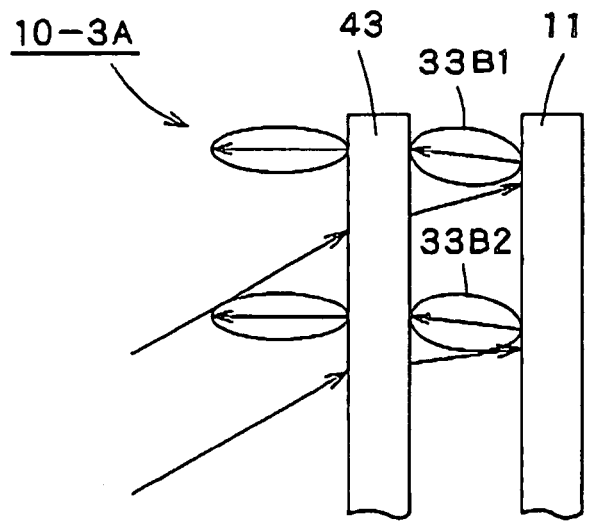
FIG. 17D is a view for explaining the optical function of the projection screen shown in FIG. 16.

FIG. 17D is a view showing optical paths in the upper edge portion of the projection screen 10-3A shown in FIG. 16.

As shown in FIG. 17D, the angle at which imaging light projected from a projector (not shown in the figure) enters the polarized-light selective reflection layer 11 is controlled by the lenticular lens 43, and this incident light is diffuse-reflected from the polarized-light selective reflection layer 11 to be diffused light 33B1, 33B2. Specifically, the lenticular lens 43 controls the direction in which the imaging light passes through the lenticular lens 43 so that the direction in which the imaging light projected from a projector (not shown in the figure) emerges from the lenticular lens 43 is closer to the direction of the normal to the lenticular lens 43 with respect to the direction in which the imaging light has entered the lenticular lens 43.

The lenticular lens 43 makes the diffused light 33B1, 33B2 emerging from the edge portion of the polarized-light selective reflection layer 11 and a portion closer than the edge portion to the center portion of the polarized-light selective reflection layer 11, respectively, travel toward the observation side as diffused light having directivity. At this time, the directions in which the diffused light 33B1, 33B2 emerge from the lenticular lens 43 are nearly vertical to the polarized-light selective reflection layer 11, as shown in FIG. 17D. Namely, the lenticular lens 43 controls not only the angle at which the imaging light enters the polarized-light selective reflection layer 11, but also the angle at which the light diffused by the polarized-light selective reflection layer 11 emerges toward the observation side. Specifically, the lenticular lens 43 controls the direction of emergence of the imaging light so that the directions in which the light 33B1, 33B2 diffused by the polarized-light selective reflection layer 11 emerge from the lenticular lens 43 are closer to the direction of the normal to the lenticular lens 43 with respect to the direction in which the imaging light has entered the lenticular lens 43.

Thus, the projection screen 10-3A can effectively avoid having non-uniform brightness distribution and narrowed viewing angle that are brought about by differences in the point and angle at which the light diffused by the polarized-light selective reflection layer 11 emerges toward the observation side, and/or difference in the angle at which the imaging light enters the polarized-light selective reflection layer 11 at a given point.

In the above embodiment, the projection screen 10-3A is described by referring to the case where the lenticular lens 43 for vertical diffusion is provided on the observation side of the polarized-light selective reflection layer 11. Instead of the lenticular lens 43 for vertical diffusion, a lenticular lens 44 for horizontal diffusion, or a combination of the lenticular lens 43 for vertical diffusion and the lenticular lens 44 for horizontal diffusion may be provided as in projection screens 10-3B and 10-3C shown in FIGS. 18A and 18B, respectively. In the following description, explanation for the constructions and functions of components common to the projection screens 10-3B and 10-3C and the projection screen 10-3A will be omitted.

Figure 18A:
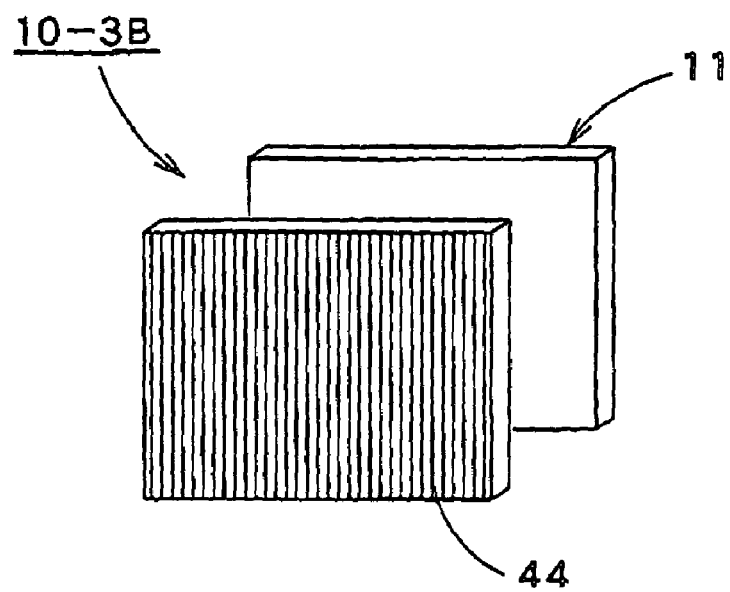
FIGS. 18A and 18B are diagrammatic perspective views showing modifications of the projection screen shown in FIG. 16.

As shown in FIG. 18A, the projection screen 10-3B comprises a lenticular lens 44 on the observation side of the polarized-light selective reflection layer 11. Both sides of the lenticular lens 44 are lens faces in the shape of a lenticular lens for horizontal diffusion. Each lenticular-lens-shaped lens face has a plurality of linear, semi-cylindrical lenses, which extend in such a direction that their longer direction agrees with the vertical direction of the polarized-light selective reflection layer 11. Therefore, the lenticular lens 44 controls the horizontal optical axis of imaging light that is projected from a projector (not shown in the figure) and is diffuse-reflected from the polarized-light selective reflection layer 11, thereby controlling the angle of emergence of the imaging light, and, at the same time, diffusing the imaging light directionally with respect to horizontal direction. Further, the lenticular lens 44 can also control the optical axis of imaging light projected from a projector (not shown in the figure), thereby controlling the horizontal angle at which the imaging light enters the polarized-light selective reflection layer 11.

Figure 18B:
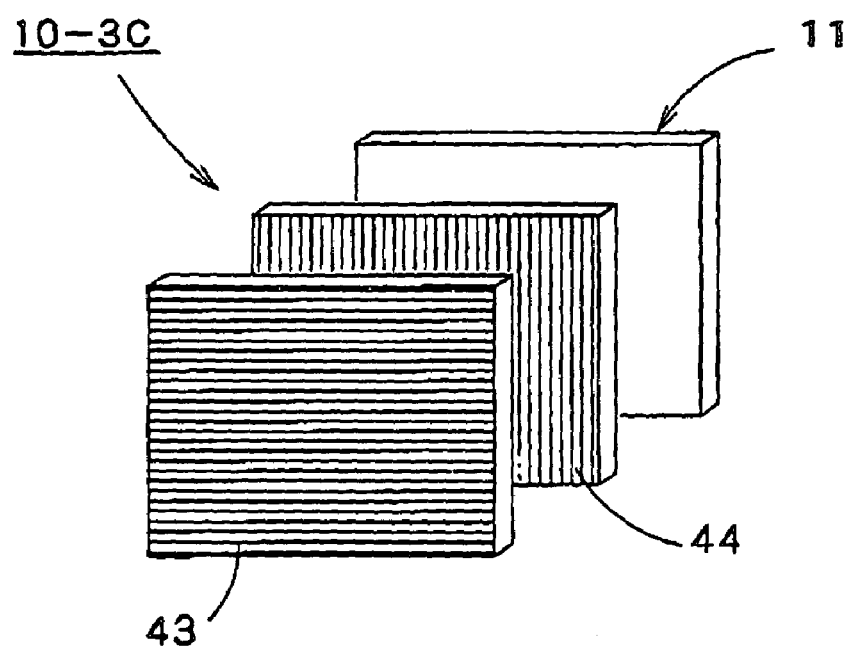

As shown in FIG. 18B, the projection screen 10-3C comprises the lenticular lens 43 for vertical diffusion and the lenticular lens 44 for horizontal diffusion that are provided on the observation side of the polarized-light selective reflection layer 11. The lenticular lenses 43 and 44 are laminated to each other, and this laminate has nearly the same optical properties as those of a so-called microlens. For this reason, the lenticular lenses 43 and 44 control the horizontal and vertical optical axes of imaging light that is projected from a projector (not shown in the figure) and is diffuse-reflected from the polarized-light selective reflection layer 11, thereby controlling the angle of emergence of the imaging light, and, at the same time, diffusing the imaging light directionally with respect to both horizontal and vertical directions. Further, by controlling the optical axis of imaging light projected from a projector (not shown in the figure), the lenticular lenses 43 and 44 can also control both the vertical and horizontal angles at which the imaging light enters the polarized-light selective reflection layer 11. In addition to the lenticular lenses 43, 44, a microlens may be provided on the observation side of the polarized-light selective reflection layer 11.

Thus, the projection screens 10-3B, 10-3C can effectively avoid having non-uniform brightness distribution and narrowed viewing angle that are caused by differences in the point and angle at which the light diffused by the polarized-light selective reflection layer 11 emerges toward the observation side, and/or difference in the angle at which the imaging light enters the polarized-light selective reflection layer 11 at a given point.

The brightness distributions on the above-described screens 10-1, 10-2A, 10-2B, 10-2C, 10-3A, 10-3B and 10-3C will be described by referring to the case where imaging light enters the polarized-light selective reflection layer 11 nearly vertically to it via the various optical members 40–44.

Imaging light projected on the entire surface of the projection screen 10-1, 10-2A, 10-2B, 10-2C, 10-3A, 10-3B, 10-3C from a projector 21 placed on the observation side of the projection screen (a projector 21 placed around the normal to the center portion of the projection screen 10-1, 10-2A, 10-2B, 10-2C, 10-3A, 10-3B, 10-3C) passes through the optical member 40, 41, 42, 43, 44, which allows the imaging light to enter the polarized-light selective reflection layer 11 nearly vertically to it. At this time, the imaging light loses its dependency on the angle of incidence on the polarized-light selective reflection layer 11. Therefore, after passing again through the optical member 40, 41, 42, 43, 44, the light reflected from the polarized-light selective reflection layer 11 returns to the vicinity of the projector 21. If a viewer observes the projection screen at a point in the vicinity of the projector 21, he/she can well see the whole screen and thus realizes that the screen is improved in brightness distribution. However, when the viewer observes the screen at a point apart from the projector 21, the edge portion of the projection screen 10-1, 10-2A, 10-2B, 10-2C, 10-3A, 10-3B, 10-3C can appear dark.

This problem can be solved and the brightness distribution on the screen is further improved if the angle at which the light reflected from the polarized-light selective reflection layer 11 emerges toward the observation side is made constant (i.e., the reflected light are made parallel to one another). By doing so, it is possible to make the screen appear almost the same regardless of the position from where a viewer observes the screen.

The angle at which the light reflected from the polarized-light selective reflection layer 11 emerges from the optical member 40, 41, 42, 43, 44, as a consequence, is related to the angle at which the imaging light projected from a projector enters the polarized-light selective reflection layer 11. Therefore, the optical member 40, 41, 42, 43, 44 is required to control the angle at which imaging light enters the polarized-light selective reflection layer 11 so that the light reflected from the polarized-light selective reflection layer 11 travels toward a viewer (the observation point). The imaging light is not necessary to enter the polarized-light selective reflection layer 11 nearly vertically to it, as described above, and can also enter the polarized-light selective reflection layer 11 following an optical path inclined toward the center of this layer 11 (see FIGS. 17A and 17B). Thus, the optical member 40, 41, 42, 43, 44 can control both the angle of incidence and the angle of emergence so that the light reflected from the polarized-light selective reflection layer 11 travels toward the viewer (the observation point), thereby improving brightness distribution on the projection screen over a wider range.

Further, the optical member 40, 41, 42, 43, 44 may be releasably or non-releasably attached to the observation side surface of the polarized-light selective reflection layer 11 by a proper bonding means such as contact bonding or adhesive bonding. The optical member 40, 41, 42, 43, 44 can improve brightness distribution and viewing angle regardless of the manner in which it is attached to the polarized-light selective reflection layer 11.

The projection screen body 10 constituting the projection screen 10-1, 10-2A, 10-2B, 10-2C, 10-3A, 10-3B, 10-3C comprises the polarized-light selective reflection layer 11 shown in FIG. 2A; that is, the polarized-light selective reflection layer 11 having a cholesteric liquid crystalline structure that is not in the state of planar orientation but in which the helical axes L extend in different directions in the layer. Instead of such a polarized-light selective reflection layer 11, it is possible to use a polarized-light selective reflection layer having any structure as long as it can selectively diffuse-reflect a specific polarized-light component.

Specifically, for example, the polarized-light selective reflection layer 11 may comprise a polarized-light selective reflection layer body for selectively reflecting a specific polarized-light component (e.g., a polarized-light selective reflection layer having such a cholesteric liquid crystalline structure in the state of planar orientation as is shown in FIG. 2B, causing specular reflection) and a diffusing element for diffusing the light reflected from the polarized-light selective reflection layer body. By so constituting the polarized-light selective reflection layer 11, it is possible to make the polarized-light-separating property and diffusing properties independent of each other, and is thus possible to easily control these two properties. The diffusing element is provided, for example, on the observation side of the polarized-light selective reflection layer 11 between the above-described optical member 40, 41, 42, 43, 44 and the polarized-light selective reflection layer body. The diffusing element may be any one of bulk diffusers, surface diffusers and hologram diffusers, or any combination of these diffusers. A bulk diffuser may be particles dispersed in a transparent medium, for example. A surface diffuser may be a structured, micro-structured, or roughened surface, for example. The diffusion provided by the diffuser may be random, regular, or partly regular.

The polarized-light selective reflection layer 11 may also be a layer that diffuse-reflects, as the specific polarized-light component, linearly polarized light. Linearly polarized light includes light in two different states of polarization, the directions of vibration being at right angles to each other. Therefore, by making the direction of linear polarization of light to be emitted from a polarizer agree with the direction of linear polarization of light which the polarized-light selective reflection layer 11 diffuse-reflects, it is possible to brightly display an image. Further, for example, a multi-layered reflective polarizer having diffusing properties, made from materials different in refractive index (e.g., DBEF manufactured by Sumitomo 3M Limited, Japan), can be employed as the layer that diffuse-reflects linearly polarized light as the specific polarized-light component. Linearly polarized light is composed of so-called P-polarized light (a component parallel to the plane of incidence) and S-polarized light (a component vertical to the plane of incidence). Therefore, when the layer that diffuse-reflects linearly polarized light selectively diffuse-reflects only a specific polarized-light component (e.g., P- or S-polarized light), it can increase image contrast like the above-described polarized-light selective reflection layer 11. Further, this layer can effectively reflect imaging light if the imaging light to be projected on the layer is made to mainly contain P- or S-polarized light.

Although the above embodiment has been described by referring to the case where the substrate 12 of the projection screen body 10 constituting the projection screen 10-1, 10-2A, 10-2B, 10-2C, 10-3A, 10-3B, 10-3C is an absorptive substrate containing a light-absorbing layer adapted to absorb light in the visible region, the substrate 12 may also be a transparent substrate adapted to transmit at least part of light in the visible region. If a transparent substrate is used as the substrate 12, although the advantage of enhancing image contrast is lost, the projection screens 10-1, 10-2A to 10-2C, and 10-3A to 10-3C are highly transparent when not displaying an image, and the background can thus be clearly seen through the projection screens. These projection screens 10-1, 10-2A to 10-2C, and 10-3A to 10-3C can be used in decorative applications; for example, they are fit for use on show windows. Moreover, by switching the viewing angle according to the situation, it is possible to produce a more effective eye-catching effect. For this reason, these projection screens can overcome the drawback of conventional information tools using projectors that they are not attractive in bright environments, and can effectively be used in such applications as billboards, bulletin boards, and guideboards. Although the transparent substrate is preferably less hazy, any material selected from acrylic esters, glass, vinyl chloride resins, etc. may be used for the substrate 12 as long as it can transmit light. Further, the transparent substrate is not necessarily colorless, and a colored one may also be used. Specifically, it is possible to use transparent plastic or glass plates in a color of brown, blue, orange, or the like that are usually used for partition walls, windows, and so forth.

Furthermore, the above embodiment has been described by referring to the case where, in the projection screen body 10 constituting the projection screens 10-1, 10-2A, 10-2B, 10-2C, 10-3A, 10-3B and 10-3C, an intermediate layer 13 having adhesion properties (an adherent layer) is provided between the polarized-light selective reflection layer 11 and the substrate 12, or between each neighboring two of the partial selective reflection layers 11a, 11b and 11c that constitute the polarized-light selective reflection layer 11. The intermediate layer 13 may have barrier properties in addition to (or in place of) the adhesion properties. The barrier properties herein mean the following: when the polarized-light selective reflection layer is laminated directly to the substrate, or when one partial selective reflection layer is laminated directly to another partial selective reflection layer, the constituents of the lower layer are prevented from migrating to (permeating through) the upper layer, or the constituents of the upper layer are prevented from migrating to (permeating through) the lower layer. If substances migrate between the upper and lower layers, the optical properties (wavelength selectivity, polarization selectivity, diffusing properties, etc.) inherent in the polarized-light selective reflection layer (or each partial selective reflection layer) that serves as the upper or lower layer are impaired. However, this can be prevented by the use of the above-described intermediate layer having barrier properties (barrier layer). Specifically, for example, in the case where a partial selective reflection layer is laminated to another partial selective reflection layer by applying a cholesteric liquid crystalline composition, a nematic liquid crystal component contained in the liquid crystalline composition for forming the upper partial selective reflection layer permeates through the lower partial selective reflection layer to change (increase) the helical pitch in the lower partial selective reflection layer. In this case, however, if a barrier layer is provided between the lower and upper partial selective reflection layers, the migration (permeation) of the nematic liquid crystal component does not occur, and the optical properties (wavelength selectivity, polarization selectivity, diffusing properties, etc.) of the partial selective reflection layers are successively maintained.

Examples of materials that can be used for forming such a barrier layer include modified acrylates, urethane acrylates, polyester acrylates, and epoxy resins. These compounds may be either monofunctional or polyfunctional and include monomers and oligomers. Specific examples of these compounds include ethoxylated trimethylolpropane triacrylate, propoxylated glyceryl triacrylate, pentaerythritol tetraacrylate, ditrimethylolpropane tetraacrylate, dipentaerythritol hydroxypentaacrylate, ethoxylated pentaerythritol tetraacrylate, pentaacrylic ester, pentaerythritol triacrylate, trimethylolpropane triacrylate, trimethylolpropane PO-modified triacrylate, isocyanuric acid EO-modified triacrylate, trimethylolpropane EO-modified triacrylate, dipentaerythritol penta- or hexa-acrylate, urethane adducts, aliphatic polyamine epoxy resins, polyaminoamide epoxy resins, aromatic diamine epoxy resins, alicyclic diamine epoxy resins, phenolic epoxy resins, amino epoxy resins, mercaptan epoxy resins, dicyandiamide epoxy resins, and Lewis acid complex epoxy resins.

Projection System

Figure 19:
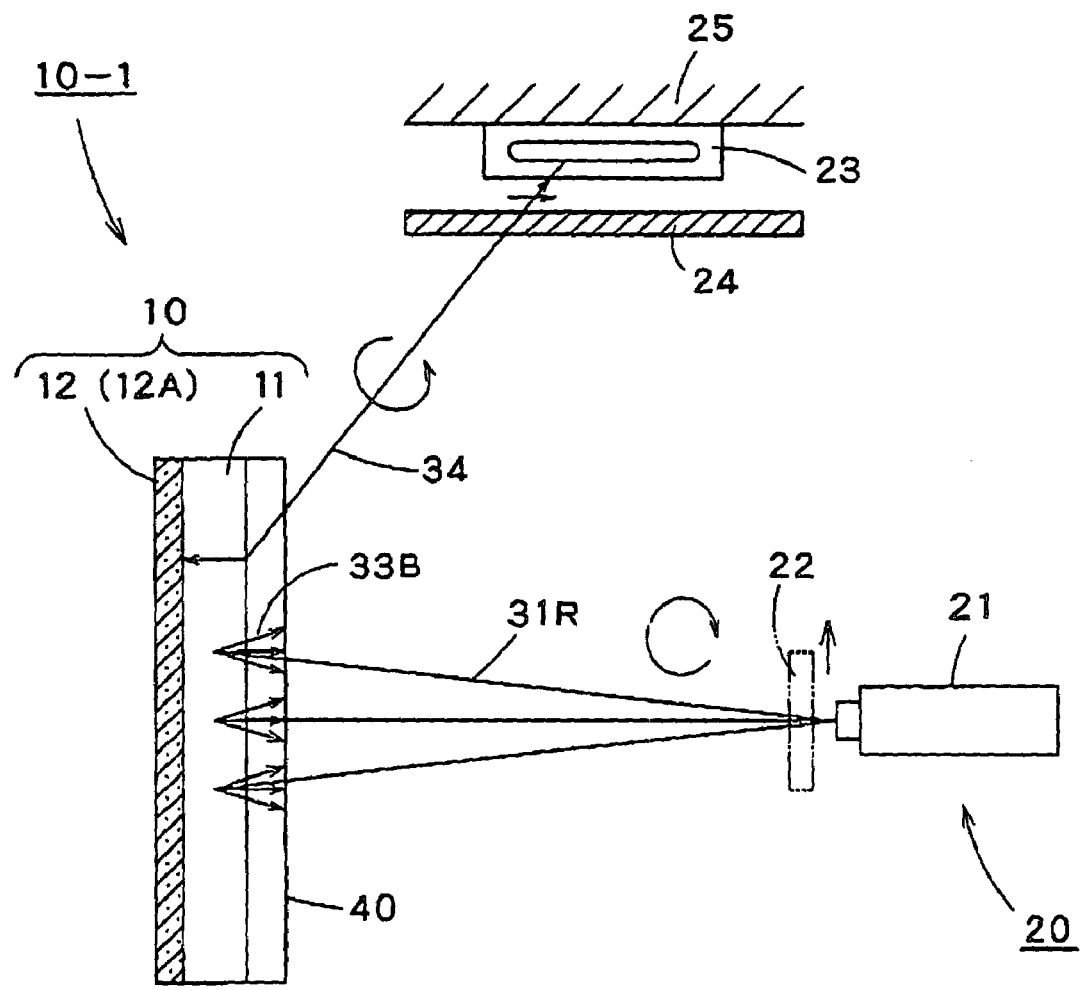
FIG. 19 is a diagrammatic view showing a projection system comprising the projection screen shown in FIG. 1.

The aforementioned projection screen 10-1, 10-2A, 10-2B, 10-2C, 10-3A, 10-3B, 10-3C can be incorporated into a projection system 20 comprising a projector 21, as shown in FIG. 19. Although explanation will now be given by referring to the projection system 20 comprising the projection screen 10-1, the basic construction and actions of the projection system comprising any of the other projection screens 10-2A to 10-2C, and 10-3A to 10-3C are the same as those of the projection system comprising the projection screen 10-1.

As shown in FIG. 19, the projection system 20 comprises the projection screen 10-1 and the projector 21 for projecting imaging light on the projection screen 10-1.

Of these components, the projector 21 may be of any type, and a CRT projector, a liquid crystal projector, a DLP (digital light processing) projector, or the like can be used. It is, however, preferable that the imaging light to be projected on the projection screen 10-1 from the projector 21 chiefly contains a polarized-light component (e.g., right-handed circularly polarized light) that is identical with the polarized-light component which the projection screen 10-1 selectively reflects.

Because of its operating principle, a liquid crystal projector useful as the projector 21 usually emits light that is polarized substantially linearly. In this case, by letting the imaging light emerge from the projector 21 through a retardation layer 22 or the like, it is possible to convert the linearly polarized light into circularly polarized light without causing the loss of the amount of light.

A quarter wave plate is preferably used as the retardation layer 22. Specifically, an ideal retardation layer is one capable of causing a phase shift of 137.5 nm for light of 550 nm whose visibility is highest. Further, a wide-wave-range quarter wave plate is more preferable because it is applicable to light in all of the red (R), green (G) and blue (B) color wave ranges. It is also possible to use a single retardation layer produced by controlling the birefringence of a material for this layer, or a retardation layer using a quarter wave plate in combination with a half wave plate.

The retardation layer 22 may be externally attached to the exit aperture of the projector 21, as shown in FIG. 19, or internally placed in the projector 21.

When a CRT or DLP projector is used as the projector 21, since the projector 21 emits unpolarized light, it is necessary to use a circular polarizer composed of a linear polarizer and a retardation layer in order to convert the unpolarized light into circularly polarized light. If such a circular polarizer is used, although the amount of light emitted from the projector 21 itself is decreased to half, it is possible to effectively prevent the production of stray light or the like from a polarized-light component (e.g., left-handed circularly polarized light) that is different from the polarized-light component which the polarized-light selective reflection layer 11 in the projection screen 10-1 selectively reflects, thereby enhancing image contrast. In the case where linearly polarized light is produced by an optical system incorporated in the projector 21, only a retardation layer may be used without using a linear polarizer.

A projector 21 usually attains color display utilizing light in the wave ranges for red (R), green (G) and blue (B) colors, the three primary colors of light. For example, assuming that light enters the projection screen 10-1 vertically to it, the projector 21 is made to project light in wave ranges with center wavelengths of 430–460 nm, 540–570 nm, and 580–620 nm. For this reason, it is preferable that the projection screen 10-1 is made to selectively reflect only light in wave ranges identical with the wave ranges in which the imaging light projected from the projector 21 fall. By so making the projection screen 10-1, it is possible to prevent the reflection of environmental light, such as sunlight and light from lighting fixtures, in the visible region, not in the above-described wave ranges, thereby enhancing image contrast.

The projection system 20 usually comprises an illuminant 23 that is fixed to an illuminant-fixing member 25 such as the ceiling of a room, and this illuminant 23 illuminates a space in which the projection screen 10-1 is placed.

As shown in FIG. 19, in the case where the illuminant 23 is so positioned that the light 34 emitted from the illuminant 23 directly illuminates the projection screen 10-1, it is preferable to make the light 34 to be emitted from the illuminant 23 toward the projection screen 10-1 mainly contain a polarized-light component (e.g., left-handed circularly polarized light) that is different from the polarized-light component which the projection screen 10-1 selectively reflects. By so making the light 34, it is possible to effectively prevent the light 34 from being reflected from the polarized-light selective reflection layer 11 in the projection screen 10-1, thereby enhancing image contrast. The angle at which the light 34 enters the projection screen 10-1 is controlled by the circular Fresnel lens 40 provided on the observation side of the projection screen body 10, and this incident light then passes through the polarized-light selective reflection layer 11 in the projection screen body 10.

It is possible to control the state of polarization of the light 34 that is emitted from the illuminant 23, by providing, in the vicinity of the illuminant 23, a polarizer film 24 capable of transmitting left-handed circularly polarized light. An absorption circular polarizer or a polarized-light separator (reflection circular polarizer) may be used as the polarizer film 24. Examples of polarized-light separators useful herein include circularly-polarized-light separators using cholesteric liquid crystal layers, and linearly-polarized-light separators containing, on the exit side, retardation layers for converting linearly polarized light into circularly polarized light. These polarized-light separators are superior to absorption circular polarizers because they cause smaller loss of the amount of light than absorption circular polarizers do.

Figure 20:
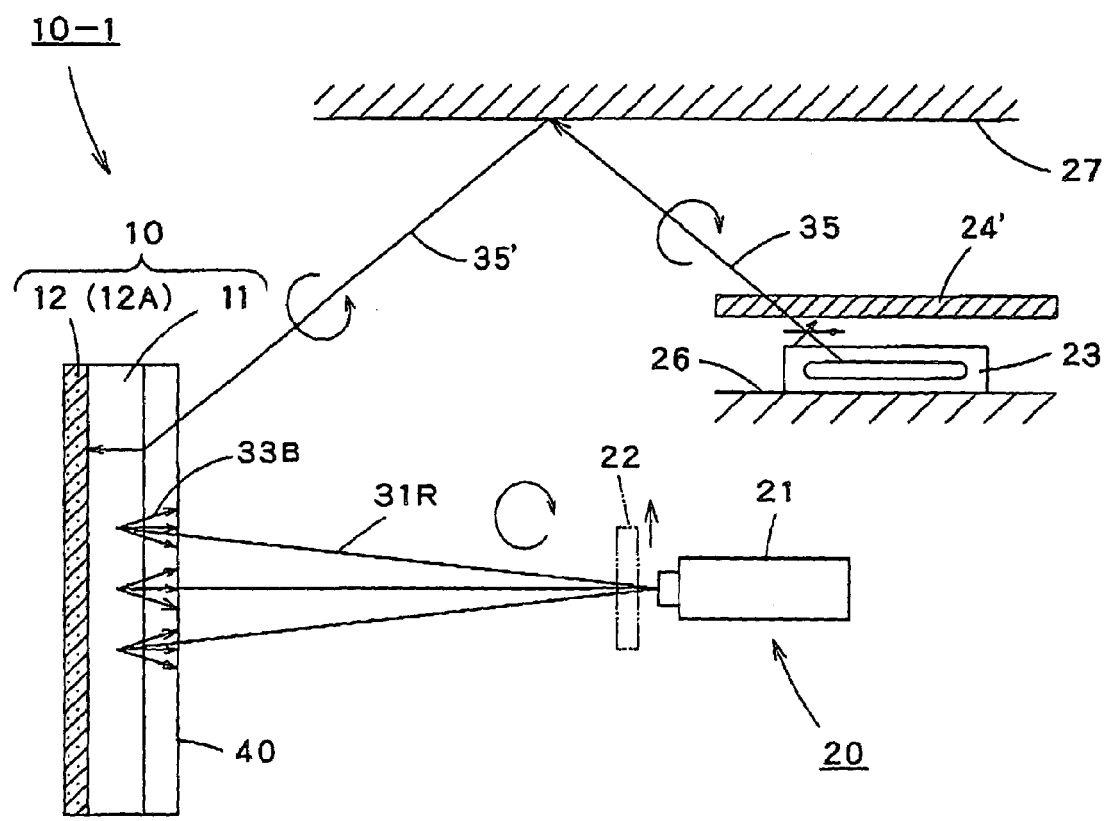
FIG. 20 is a diagrammatic view showing another projection system comprising the projection screen shown in FIG. 1.

In the projection system 20 shown in FIG. 19, the light 34 emitted from the illuminant 23 directly illuminates the projection screen 10-1. The present invention is not limited to this and also includes an embodiment in which the illuminant 23 is, as shown in FIG. 20, fixed on an illuminant-fixing member 26 other than the ceiling so that the light 35 emitted from the illuminant 23 indirectly illuminates, as light 35', the projection screen 10-1 via a reflector 27 such as the ceiling. In this case, circularly polarized light reverses in the state of polarization when reflected from the reflector 27. It is, therefore, preferable to make the light 35 to be emitted from the illuminant 23 toward the reflector 27 mainly contain a polarized-light component (e.g., right-handed circularly polarized light) that is identical with the polarized-light component which the projection screen 10-1 selectively reflects, by providing a polarizer film 24' or the like that transmits right-handed circularly polarized light, as in the case shown in FIG. 19. The polarizer film 24' may be the same as the above-described polarizer film 24. If such a polarizer film is used, the light 35' that has reversed in the state of polarization owing to the reflector 27 is to mainly contain a polarized-light component (e.g., left-handed circularly polarized light) that is different from the polarized-light component which the projection screen 10-1 selectively reflects. It is, therefore, possible to effectively prevent the light 35' from being reflected from the polarized-light selective reflection layer 11 in the projection screen 10-1, thereby enhancing image contrast. The angle at which the light 35' enters the projection screen 10-1 is controlled by the circular Fresnel lens 40 provided on the observation side of the projection screen body 10, and this incident light then passes through the polarized-light selective reflection layer 11 in the projection screen body 10.

In the projection system 20, the projector 21 is usually placed around the normal to the center portion of the projection screen 10-1, 10-2A, 10-2B, 10-2C, 10-3A, 10-3B, 10-3C. The position of the projector 21 is not limited to this, and the projector 21 may, for example, be attached to the ceiling of a room or placed on the floor of a room. In this case, that is, in the case where the projector 21 and the projection screen 10-1, 10-2A, 10-2B, 10-2C, 10-3A, 10-3B, 10-3C are arranged in a so-called offset manner, not the entire part but only a limited part (e.g., the upper or lower half) of the optical member 40, 41, 42, 43, 44 to be provided on the observation side of the projection screen body 10 may be made to have the above-described optical functions.

Further, when using the projection screen 10-1, 10-2A, 10-2B, 10-2C, 10-3A, 10-3B, 10-3C in the projection system 20, it is better to take the following points into consideration, as needed. Namely, as mentioned above, the projection screen 10-1, 10-2A, 10-2B, 10-2C comprises, on the observation side (on the projector 21 side), the circular Fresnel lens 40 (see FIG. 13) or linear Fresnel lens 41, 42 (see FIGS. 15A, 15B and 15C). Therefore, the optical axis of imaging light (right-handed circularly polarized light 31R) incident on the projection screen at different points and angles is controlled by the circular Fresnel lens 40 or linear Fresnel lens 41, 42 so that the imaging light enters the polarized-light selective reflection layer 11 nearly vertically to it, and the light reflected from the polarized-light selective reflection layer 11 is diffused, as the reflected light 33B, toward the observation side in directions included in an approximately constant range. On the other hand, the projection screen 10-3A, 10-3B, 10-3C comprises, on the observation side (on the projector 21 side), the lenticular lens 43, 44 (see FIGS. 16, 18A and 18B). Therefore, the angle at which the light 33B reflected from the polarized-light selective reflection layer 11 emerges at different points and angles is controlled by the lenticular lens 43, 44 so that the reflected light 33B travels toward the observation side.

However, since the above-described optical members 40 to 44 are made from plastics such as acrylic resins, they may have the phase-difference-producing action. When such an action is exerted, right-handed circularly polarized light 31R, imaging light, is converted into another state of polarization. For example, if right-handed circularly polarized light 31R is converted into left-handed circularly polarized light 31L (see FIG. 10), the light that should be reflected is transmitted. In this case, it is necessary that the polarized light (left-handed circularly polarized light 31L) whose state of polarization has been converted by the optical member 40, 41, 42, 43, 44 be returned to right-handed circularly polarized light right 31R just before entering the polarized-light selective reflection layer 11. If the imaging light that is projected on the projection screen 10-1, 10-2A, 10-2B, 10-2C, 10-3A, 10-3B, 10-3C is unpolarized one, the above-described problem does not occur because unpolarized light remains as it is even if the phase-difference-producing action exerts on it.

In the above-described projection system 20, the state of polarization of the imaging light from the projector 21 and that of the light from the illuminant 23 are controlled in consideration of not only increase in viewing angle but also efficient use of imaging light, and both the imaging light (right-handed circularly polarized light 31R) and the light 34, 35' from the illuminant 23, left-handed circularly polarized light 31L, enter the projection screen 10-1, 10-2A, 10-2B, 10-2C, 10-3A, 10-3B, 10-3C. Therefore, when the projection screen 10-1, 10-2A, 10-2B, 10-2C, 10-3A, 10-3B, 10-3C is used for the projection system 20, it is preferable to take the following points into account, for example: (a) the optical member 40, 41, 42, 43, 44 should be made from a material that does not produce phase difference; (b) a compensation layer for returning the state of polarization of light that has been polarized because of the phase difference brought about by the optical member 40, 41, 42, 43, 44 to the state of polarization identical with that of the imaging light from the projector 21 should be provided between the optical member 40, 41, 42, 43, 44 and the polarized-light selective reflection layer 11; and (c) imaging light to be projected from the projector 21 should be selected in consideration of the fact that the imaging light is polarized owing to the phase difference brought about by the optical member 40, 41, 42, 43, 44 (specifically, the projector 21 should project imaging light that is converted, owing to the phase difference brought about by the optical member 40, 41, 42, 43, 44, into the polarized light which the polarized-light selective reflection layer 11 reflects).

EXAMPLES

A specific example of the above-described embodiments will now be given below.

Example

A first cholesteric liquid crystal solution having a selective reflection wave range with a center wavelength of 440 nm was prepared by dissolving, in cyclohexanone, a monomer-containing liquid crystal consisting of a main component that was an ultraviolet-curing, nematic liquid crystal (94.7% by weight) and a polymerizable chiral agent (5.3% by weight).

A liquid crystal containing a compound represented by the above chemical formula (2-xi) was used as the nematic liquid crystal.

A compound represented by the above chemical formula (5) was used as the polymerizable chiral agent.

To the first cholesteric liquid crystal solution was added 5% by weight of a photopolymerization initiator available from Ciba Specialty Chemicals K.K., Japan.

By a bar coating method, the above-prepared first cholesteric liquid crystal solution was applied to a substrate, a 1200 mm×900 mm black-colored PET film coated with an adherent layer (Lumirror/AC-X manufactured by Panack Co., Ltd., Japan).

This substrate was heated in an oven at 80° C. for 90 seconds, thereby conducting aligning treatment (drying treatment). Thus, a cholesteric liquid crystal layer containing no solvent was obtained.

Thereafter, 50 mW/cm$^2$ of ultraviolet light with a wavelength of 365 nm was applied to this cholesteric liquid crystal layer for 1 minute for curing, thereby obtaining a first partial selective reflection layer having a selective reflection wave range whose center wavelength was 440 nm.

Similarly, a second cholesteric liquid crystal solution was applied directly to the first partial selective reflection layer and then subjected to aligning treatment (drying treatment) and curing treatment. Thus, a second partial selective reflection layer having a selective reflection wave range with a center wavelength of 550 nm was obtained. The procedure used for preparing the second cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 550 nm.

Similarly, a third cholesteric liquid crystal solution was applied directly to the second partial selective reflection layer and then subjected to aligning treatment (drying treatment) and curing treatment. Thus, a third partial selective reflection layer having a selective reflection wave range with a center wavelength of 600 nm was obtained. The procedure used for preparing the third cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 600 nm.

Thus, there was obtained a projection screen body comprising a polarized-light selective reflection layer composed of the first partial selective reflection layer capable of selectively reflecting light in the blue (B) color wave range (light in the wave range with a center wavelength of 440 nm), the second partial selective reflection layer capable of selectively reflecting light in the green (G) color wave range (light in the wave range with a center wavelength of 550 nm), and the third partial selective reflection layer capable of selectively reflecting light in the red (R) color wave range (light in the wave range with a center wavelength of 600 nm) that were successively laminated to the substrate in this order. The thickness of the first partial selective reflection layer was made 3 μm, that of the second partial selective reflection layer was made 4 μm, and that of the third partial selective reflection layer was made 5 μm. Each partial selective reflection layer constituting the polarized-light selective reflection layer in the projection screen had a cholesteric liquid crystalline structure not in the state of planar orientation, and its angle of diffusion was ±20°.

On the observation side surface of the projection screen body prepared in the above-described manner, a circular Fresnel lens was placed with its lens face facing the polarized-light selective reflection layer in the projection screen body, thereby obtaining a 60-inch (1200 mm×900 mm) projection screen 1. The circular Fresnel lens used was 60-inch (1200 mm×900 mm) one with a focal length of 1400 mm, made from a 3-mm thick acrylic resin sheet.

Comparative Example

The projection screen body used in the projection screen 1 was prepared as a projection screen 2. The size of the projection screen 2 was 60 inches (1200 mm×900 mm).

(Results of Evaluation)

The projection screen 1, 2 was set vertically to the floor. A projector was placed vertically to the projection screen 1, 2 (in parallel with the floor) at a point approximately 2.5 m distant from the projection screen 1, 2.

Imaging light (a still image containing white and black parts) was projected on the projection screen 1, 2 from the projector, and the contrast of the image projected on the projection screen 1,2 was determined. Specifically, the brightness values of the white and black parts of the image in the center of the projection screen 1, 2 were measured by a luminance meter "BM-8" manufactured by Topcon Corp., Japan, and the ratio between these two values was obtained as contrast [contrast=(brightness of white part)÷(brightness of black part)].

The brightness distributions on the projection screens 1, 2 were obtained in the above-described manner. The ratio of the brightness of the white-indicating part of the image in the center portion of the projection screen, in which the imaging light was brightest, to the brightness of the white-indication part of the image in the upper edge portion (upper right and left) of the projection screen, in which the imaging light was darkest, was 10%.

On the other hand, in the case of the projection screen 1, the above-described brightness ratio was 60%. It was thus confirmed that the projection screen 1 was greatly improved in brightness distribution.

What is claimed is:

1. A projection screen for displaying an image by reflecting imaging light that is projected from an observation side, the projection screen comprising:
    a polarized-light selective reflection layer that selectively diffuse-reflects a specific polarized-light component; and
    an optical member provided on an observation side of the polarized-light selective reflection layer, the optical member controlling a direction in which the imaging light diffuse-reflected from the polarized-light selective reflection layer emerges from the projection screen,
    wherein the optical member controls the direction of emergence of the imaging light so that the imaging light diffuse-reflected from the polarized-light selective reflection layer travels in a specific direction between a direction in which the imaging light has entered the polarized-light selective reflection layer and a direction in which the entered image light travels when specularly reflected.

2. The projection screen according to claim 1, wherein the optical member controls a direction in which the imaging light passes through the optical member so that a direction in which the imaging light emerges from the optical member toward the polarized-light selective reflection layer is closer to a direction of a normal to the optical member than the direction in which the imaging light has entered the optical member.

3. The projection screen according to claim 1, wherein the specific polarized-light component is right- or left-handed circularly polarized light.

4. The projection screen according to claim 1, wherein the specific polarized-light component is linearly polarized light of one vibration direction.

5. The projection screen according to claim 1, wherein the polarized-light selective reflection layer includes a polarized-light selective reflection layer body that reflects the specific polarized-light component, and a diffusing element that diffuses light that is reflected from the polarized-light selective reflection layer body.

6. The projection screen according to claim 1, wherein the polarized-light selective reflection layer itself has a diffusing property.

7. The projection screen according to claim 6, wherein the polarized-light selective reflection layer has a cholesteric liquid crystalline structure, and, owing to structural non-uniformity in the cholesteric liquid crystalline structure, diffuses the specific polarized-light component.

8. The projection screen according to claim 1, further comprising a substrate that supports the polarized-light selective reflection layer.

9. The projection screen according to claim 8, wherein the substrate is an absorptive substrate comprising a light-absorbing layer adapted to absorb light in a visible region.

10. The projection screen according to claim 8, wherein the substrate is a transparent substrate adapted to transmit at least part of light in a visible region.

11. The projection screen according to claim 1, wherein the polarized-light selective reflection layer includes at least two partial selective reflection layers that are laminated to each other.

12. The projection screen according to claim 11, wherein an intermediate layer having a barrier property is provided between each neighboring two of the partial selective reflection layers.

13. The projection screen according to claim 11, wherein an intermediate layer having an adhesion property is provided between each neighboring two of the partial selective reflection layers.

14. The projection screen according to claim 1, wherein the optical member is at least one member selected from a group consisting of a Fresnel lens, a prism lens, a lenticular lens and a microlens.

15. The projection screen according to claim 1, further comprising a functional layer containing at least one layer selected from a group consisting of a hard coat layer, an anti-glaring layer, an anti-reflection layers, an ultraviolet-light-absorbing layer and an antistatic layer.

16. The projection screen according to claim 15, wherein the functional layer is an anti-glaring layer, which is composed of a layer with an irregularly roughened surface, isotropic with respect to refractive index.

17. The projection screen according to claim 16, wherein the anti-glaring layer is a TAC film with a matte surface.

18. A projection system comprising:
    the projection screen according to claim 1; and
    a projector that projects imaging light on the projection screen.

19. The projection system according to claim 18, wherein the projection screen selectively reflects only light in a wave range identical with a wave range in which the imaging light projected from the projector falls.

20. The projection system according to claim 18, wherein the imaging light to be projected on the projection screen from the projector mainly contains a same polarized-light component as the one which the projection screen selectively reflects.

21. The projection system according to claim 18, further comprising an illuminant that illuminates a space in which the projection screen is placed, being so set that light from the illuminant directly illuminates the projection screen, wherein
    the light that is emitted from the illuminant toward the projection screen mainly contains a polarized-light component different from the one which the projection screen selectively reflects.

22. The projection system according to claim 18, further comprising an illuminant that illuminates a space in which the projection screen is placed, being so set that light from the illuminant indirectly illuminates the projection screen via a reflector, wherein the light that is emitted from the illuminant toward the reflector mainly contains a same polarized-light component as the one which the projection screen selectively reflects.

* * * * *